(12) United States Patent
Hattori et al.

(10) Patent No.: US 9,283,727 B2
(45) Date of Patent: Mar. 15, 2016

(54) METHOD FOR PRODUCING HOLLOW FIBER MEMBRANE SHEET-LIKE OBJECT, METHOD FOR PRODUCING HOLLOW FIBER MEMBRANE MODULE, AND DEVICE FOR PRODUCING HOLLOW FIBER MEMBRANE SHEET-LIKE OBJECT

(75) Inventors: Kiyoshi Hattori, Toyohashi (JP);
Makoto Ideguchi, Toyohashi (JP);
Nobuyasu Ueno, Toyohashi (JP);
Satoshi Suzuki, Toyohashi (JP);
Yoshihito Nakahara, Toyohashi (JP);
Taro Tsujimura, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 551 days.

(21) Appl. No.: 13/823,405

(22) PCT Filed: Sep. 15, 2011

(86) PCT No.: PCT/JP2011/071103
§ 371 (c)(1),
(2), (4) Date: May 2, 2013

(87) PCT Pub. No.: WO2012/036235
PCT Pub. Date: Mar. 22, 2012

(65) Prior Publication Data
US 2013/0210596 A1    Aug. 15, 2013

(30) Foreign Application Priority Data

Sep. 16, 2010    (JP) ............................... P2010-208377

(51) Int. Cl.
*B01D 69/08* (2006.01)
*B31C 3/00* (2006.01)
*D06H 7/00* (2006.01)

(52) U.S. Cl.
CPC . *B31C 3/00* (2013.01); *B01D 69/08* (2013.01); *B01D 69/087* (2013.01); *D06H 7/00* (2013.01); *B01D 2323/42* (2013.01)

(58) Field of Classification Search
CPC ...... B31C 3/00; B01D 69/08; B01D 2223/42; B01D 69/087; D06H 7/00
See application file for complete search history.

(56) References Cited

U.S. PATENT DOCUMENTS 3,690,465 A * 9/1972 McGinnis .............. B01D 53/22
                                                  210/321.88

(Continued)

FOREIGN PATENT DOCUMENTS

| CN | 1191768 A | 9/1998 |
| CN | 101058059 A | 10/2007 |

(Continued)

OTHER PUBLICATIONS

U.S. Appl. No. 14/390,226, filed Oct. 2, 2014, Ideguchi, et al.

(Continued)

*Primary Examiner* — Jeff Aftergut
(74) *Attorney, Agent, or Firm* — Oblon, McClelland, Maier & Neustadt, L.L.P.

(57) ABSTRACT

The present invention relates to a method for producing a hollow fiber membrane sheet-like object including: a connecting process of forming a ring-shaped section by winding a hollow fiber membrane capable of being continuously supplied, around two or more rolls so as to surround the two or more rolls and connecting a leading end portion of the wound hollow fiber membrane and an adjacent hollow fiber membrane, or of putting a ring-shaped section created in advance, on two or more rolls, and connecting a leading end portion of a hollow fiber membrane capable of being continuously supplied, to the ring-shaped section; a winding process of winding the hollow fiber membrane around the rolls by moving the leading end portion of the hollow fiber membrane by rotating at least one roll of the two or more rolls; a fixing process of forming a fixed section by fixing the hollow fiber membrane wound around the two or more rolls, into the form of a sheet in a width direction; and a cutting process of performing cutting-out along the fixed section, thereby obtaining a sheet-like object to which end portions of the hollow fiber membranes are connected in the width direction. According to the present invention, a hollow fiber membrane sheet-like object can be produced with a simple configuration and a change in sheet length can be easily performed.

18 Claims, 25 Drawing Sheets

(56) References Cited

U.S. PATENT DOCUMENTS

| | | | |
|---|---|---|---|
| 3,755,034 A * | 8/1973 | Mahon | B01D 63/021 156/169 |
| 3,801,401 A * | 4/1974 | Cope | B01D 53/22 156/172 |
| 5,472,607 A | 12/1995 | Mailvaganam et al. | |
| 6,280,626 B1 | 8/2001 | Miyashita et al. | |
| 6,325,938 B1 | 12/2001 | Miyashita et al. | |
| 6,328,886 B1 | 12/2001 | Miyashita et al. | |
| 7,070,721 B2 | 7/2006 | Ji et al. | |
| 7,250,108 B2 * | 7/2007 | Boivin | B01D 63/02 210/321.87 |
| 2001/0009235 A1 | 7/2001 | Sakashita et al. | |
| 2004/0200768 A1 | 10/2004 | Dannenmaier et al. | |
| 2007/0181488 A1 | 8/2007 | Dannenmaier et al. | |
| 2011/0031180 A1 | 2/2011 | Tada et al. | |
| 2012/0012514 A1 | 1/2012 | Sasakawa et al. | |

FOREIGN PATENT DOCUMENTS

| | | |
|---|---|---|
| CN | 101160165 A | 4/2008 |
| CN | 101663083 A | 3/2010 |
| CN | 101829503 A | 9/2010 |
| JP | 56-51210 A | 5/1981 |
| JP | 1 176405 | 7/1989 |
| JP | 3 97957 | 4/1991 |
| JP | 4 310219 | 11/1992 |
| JP | 4-371219 A | 12/1992 |
| JP | 6 31143 | 2/1994 |
| JP | 9-117648 A | 5/1997 |
| JP | 10 57782 | 3/1998 |
| JP | 10 314553 | 12/1998 |
| JP | 11-9968 A | 1/1999 |
| JP | 11 76764 | 3/1999 |
| JP | 11-128692 A | 5/1999 |
| JP | 2000-107756 A | 4/2000 |
| JP | 2000-237549 A | 9/2000 |
| JP | 2000-254457 A | 9/2000 |
| JP | 2002-282655 A | 10/2002 |
| JP | 2003-260338 A | 9/2003 |
| JP | 2004-203564 A | 7/2004 |
| JP | 2004 216276 | 8/2004 |
| JP | 2004-337845 A | 12/2004 |
| JP | 2005-125198 A * | 5/2005 |
| JP | 2006-61816 A | 3/2006 |
| JP | 2007-152238 A | 6/2007 |
| JP | 2008-137005 A | 6/2008 |
| JP | 2008-142583 A | 6/2008 |
| JP | 2008-266801 A * | 11/2008 |
| JP | 2009-195844 A | 9/2009 |
| JP | 2009-285527 A | 12/2009 |
| TW | 337537 B | 8/1998 |
| WO | WO 03/064014 A1 | 8/2003 |
| WO | WO 2007/080910 A1 | 7/2007 |
| WO | WO 2010/068778 A1 | 6/2010 |
| WO | WO 2010/098089 A1 | 9/2010 |

OTHER PUBLICATIONS

Combined Office Action and Search Report issued in Dec. 3, 2014 in Chinese Patent Application No. 201180054613.8 (with English language translation).

International Search Report issued Jun. 11, 2013 in PCT/JP2013/060098 (with English language translation).

Office Action issued Jul. 28, 2015 in Japanese Patent Application No. 2011-544306 (with English language translation).

Combined Office Action and Search Report issued Jul. 29, 2015 in Taiwanese Patent Application No. 100133451 (with Partial English translation).

International Search Report Issued Nov. 8, 2011 in PCT/JP11/71103 Filed Sep. 15, 2011.

* cited by examiner

CROSS-SECTIONAL VIEW ALONG THE LINE A-A

METHOD FOR PRODUCING HOLLOW FIBER MEMBRANE SHEET-LIKE OBJECT, METHOD FOR PRODUCING HOLLOW FIBER MEMBRANE MODULE, AND DEVICE FOR PRODUCING HOLLOW FIBER MEMBRANE SHEET-LIKE OBJECT

CROSS REFERENCE TO RELATED APPLICATIONS

The present application is a 35 U.S.C. §371 national stage patent application of International patent application PCT/JP2011/071103, filed on Sep. 15, 2011, published as WO 2012/036235 on Mar. 22, 2012, the text of which is incorporated by reference, and claims the benefit of the filing date of Japanese application no. 2010-208377, filed on Sep. 16, 2010, the text of which is also incorporated by reference.

TECHNICAL FIELD

The present invention relates to method and device for producing a hollow fiber membrane sheet-like object constituting a hollow fiber membrane module which is used in a solid-liquid separation operation such as water treatment.

Priority is claimed on Japanese Patent Application No. 2010-208377, filed Sep. 16, 2010, the content of which is incorporated herein by reference.

BACKGROUND ART

A hollow fiber membrane module is used in a large number of uses such as production of sterile water, drinking water, or high-grade pure water and air purification. As the hollow fiber membrane module, hollow fiber membrane modules having various forms such as a form in which hollow fiber membranes are disposed in the form of a bundle, and a form in which hollow fiber membranes are disposed in the form of a sheet and stacked are produced (refer to PTL 1).

A hollow fiber membrane module having a form in which hollow fiber membranes are stacked is also referred to as a flat hollow fiber membrane module and is a hollow fiber membrane module in which a plurality of hollow fiber membranes stacked are fixed to each other by a housing. The housing is disposed such that both end portions of the plurality of hollow fiber membranes are accommodated inside the housing. In general, stacked hollow fiber membranes are produced by stacking hollow fiber membrane sheet-like objects each made in the form of sheet by trimming the hollow fiber membranes to a predetermined length in a state of being arranged at a desired pitch and sticking the hollow fiber membranes to each other.

As a device for producing a hollow fiber membrane sheet-like object, a device for producing a hollow fiber membrane sheet-like object by spirally winding a hollow fiber membrane on a drum or a rack frame at a desired pitch, performing thermal fusion bonding of at least a portion thereof, and cutting the thermally fused and bonded portion is known (refer to PTL 2 and PTL 3).

CITATION LIST

Patent Literature

[PTL 1] Japanese Unexamined Patent Application, First Publication No. H4-310219
[PTL 2] Japanese Unexamined Patent Application, First Publication No. H10-314553
[PTL 3] Japanese Unexamined Patent Application, First Publication No. 2004-216276

SUMMARY OF INVENTION

Technical Problem

In the device for producing a hollow fiber membrane sheet-like object according to the related art described above, for example, in PTL 2, a hollow fiber membrane sheet-like object is obtained by winding a hollow fiber membrane around a drum and then cutting out the sheet-shaped hollow fiber membranes wound at a desired pitch by cutting means. In such a method, it is necessary to perform fixing such as sticking the hollow fiber membranes to each other, at a stage before the sheet-shaped hollow fiber membranes are cut out.

In a case of fixing the hollow fiber membranes to each other, it is preferable to dispose fixing means which is used in a pair on both sides with the hollow fiber membrane interposed therebetween and performs welding the hollow fiber membranes to each other, by disposing, for example, a horn and an anvil of an ultrasonic welding machine such that the hollow fiber membranes arranged in a row at a desired pitch are interposed therebetween.

However, since the device for producing a hollow fiber membrane sheet-like object described in PTL 2 has a configuration in which the hollow fiber membrane is wound around the drum at a desired pitch and the drum itself rotates, there is a problem in that a receiving tool of the fixing means cannot be disposed.

Similarly, also in the production device described in PTL 3, since the rack frame rotates, there is a problem in that a receiving tool of fixing means for fixing the hollow fiber membranes to each other cannot be disposed, and thus it is difficult to perform thermal fusion boding for sheet formation.

Further, in order to wind the hollow fiber membrane around the drum or the rack frame at a desired pitch, a guide roll which is provided in the production device described in, for example, PTL 2 is required. In order to wind the hollow fiber membrane at a desired pitch, a mechanism (a traversing mechanism) to move the guide roll parallel to the central axis of the drum is required, and thus there is a problem in that the configuration of the device becomes complicated.

In addition, when winding the hollow fiber membrane, there is a concern that the hollow fiber membrane may be twisted, and thus there is a problem in that there is a concern that the quality of a product may be deteriorated.

In addition, in a case where it is necessary to change a sheet length of a hollow fiber membrane sheet-like object, since it is necessary to perform drum replacement or change the gap between the rack frames, there is a problem in that a change is not easy.

In addition, in a case of making a sheet length large, it is necessary to make the size of the drum or the rack frame large by a corresponding amount, and thus there is a problem in that the size of the device becomes larger.

The present invention has been made in consideration of such circumstances and an object thereof is to provide a method for producing a hollow fiber membrane sheet-like object, a method for producing a hollow fiber membrane module, and a device for producing a hollow fiber membrane sheet-like object, in which a hollow fiber-membrane sheet-like object wound at a desired pitch can be produced with a simple configuration and a change in sheet length can be easily performed.

Solution to Problem

As means for solving the above problems, according to a first aspect of the invention, there is provided a method for producing a hollow fiber membrane sheet-like object including: a connecting process of forming a ring-shaped section by winding a hollow fiber membrane capable of being continuously supplied, around two or more rolls so as to surround the two or more rolls and connecting a leading end portion of the wound hollow fiber membrane and an adjacent hollow fiber membrane, or of putting a ring-shaped section created in advance, on two or more rolls, and connecting a leading end portion of a hollow fiber membrane capable of being continuously supplied, to the ring-shaped section; a winding process of winding the hollow fiber membrane around the rolls by moving the leading end portion of the hollow fiber membrane by rotating at least one roll of the two or more rolls; a fixing process of forming a fixed section by fixing the hollow fiber membrane wound around the two or more rolls, into the form of a sheet in a width direction; and a cutting process of performing cutting-out along the fixed section, thereby obtaining a sheet-like object in which end portions of the hollow fiber membranes are connected in the width direction.

Due to such a configuration, a traversing mechanism is unnecessary and the production device can be constructed with fewer components.

Further, due to a device using this method, as means for fixing the hollow fiber membranes into the form of a sheet, it becomes possible to adopt fixing means for fixing the hollow fiber membranes arranged in a row, from both sides, with the hollow fiber membranes interposed therebetween.

It is preferable that in the winding process, the leading end portion be wound around outer peripheries of the rolls while changing a relative position of the leading end portion on the rolls in a roll width direction for each round.

It is preferable that in the winding process, the leading end portion be moved without changing a relative position of the leading end portion with respect to the rolls while the leading end portion is in contact with the rolls.

It is preferable that axes of the two or more rolls surrounded by the hollow fiber membrane be disposed so as to be parallel to each other.

It is preferable that at least one roll of the two or more rolls be provided with circumferential grooves over the approximately entire area in the width direction.

It is preferable that pitches of the grooves be the same pitch.

It is preferable that the two or more rolls be disposed in a vertical direction.

Further, it is preferable that the method further includes a process of adjusting a peripheral length such as shortening a winding peripheral length of the wound hollow fiber membrane after the fixing process and before the cutting process.

According to a second aspect of the invention, there is provided a method for producing a hollow fiber membrane module including: a process of fixing an end portion on at least one side of the hollow fiber membrane sheet-like object obtained by the above method to a housing by using potting resin.

According to a third aspect of the invention, there is provided a device for producing a hollow fiber membrane sheet-like object including: two or more rolls; supply means for continuously supplying a hollow fiber membrane to the two or more rolls; connection means for forming a ring-shaped section by winding the hollow fiber membrane capable of being continuously supplied, around the two or more rolls so as to surround the two or more rolls and connecting a leading end portion of the wound hollow fiber membrane and an adjacent hollow fiber membrane, or for putting a ring-shaped section created in advance, on the two or more rolls, and connecting a leading end portion of the hollow fiber membrane capable of being continuously supplied, to the ring-shaped section; driving means for rotating at least one roll of the two or more rolls, thereby winding the hollow fiber membrane around the two or more rolls; and fixing means for fixing the hollow fiber membranes into the form of a sheet in a width direction of each of the two or more rolls.

Due to such a configuration, a device for producing a hollow fiber membrane sheet-like object can be provided in which it is possible to produce a hollow fiber membrane sheet-like object with a simple configuration and a change in sheet length can be easily performed.

It is preferable that the production device further includes cutting means for cutting a fixed section formed by the fixing means to cut out the plurality of hollow fiber membranes at the fixed section.

Due to such a configuration, it becomes possible to automate a process of obtaining a sheet-like object by cutting the hollow fiber membrane to a desired size.

It is preferable that axes of the two or more rolls surrounded by the hollow fiber membrane be disposed so as to be parallel to each other.

It is preferable that at least one roll of the two or more rolls be provided with circumferential grooves over the approximately entire area in the width direction.

It is preferable that pitches of the grooves be the same pitch.

Due to such a configuration, when winding a plurality of hollow fiber membranes so as to surround the respective rolls, it is possible to reliably shift a leading end portion of the wound hollow fiber membrane by an amount corresponding to a predetermined pitch from one end side in the width direction of the roll to the other end side.

For this reason, it becomes possible to reliably improve the productivity and the quality of a hollow fiber membrane sheet-like object.

It is preferable that grooves provided in one of the two or more rolls and grooves provided in the other rolls be parallel.

It is preferable that the two or more rolls be disposed in a vertical direction.

It is preferable that the supply means be a bobbin unwinding device.

It is preferable that the device for producing a hollow fiber membrane sheet-like object further includes means for adjusting a winding peripheral length.

Advantageous Effects of Invention

According to the invention, a traversing mechanism is unnecessary and the production device can be constructed with fewer components.

Further, due to a device using this method, as means for fixing the hollow fiber membranes into the form of a sheet, it becomes possible to adopt fixing means for fixing the hollow fiber membranes arranged in a row at a desired pitch, from both sides with the hollow fiber membranes interposed therebetween.

In addition, by supplying a plurality of hollow fiber membranes at a time, it is possible to shorten time to be taken while a hollow fiber membrane sheet-like object is formed in a desired width.

For this reason, it becomes possible to quicken the production speed of a hollow fiber membrane sheet-like object.

DESCRIPTION OF EMBODIMENTS

Figure 1:
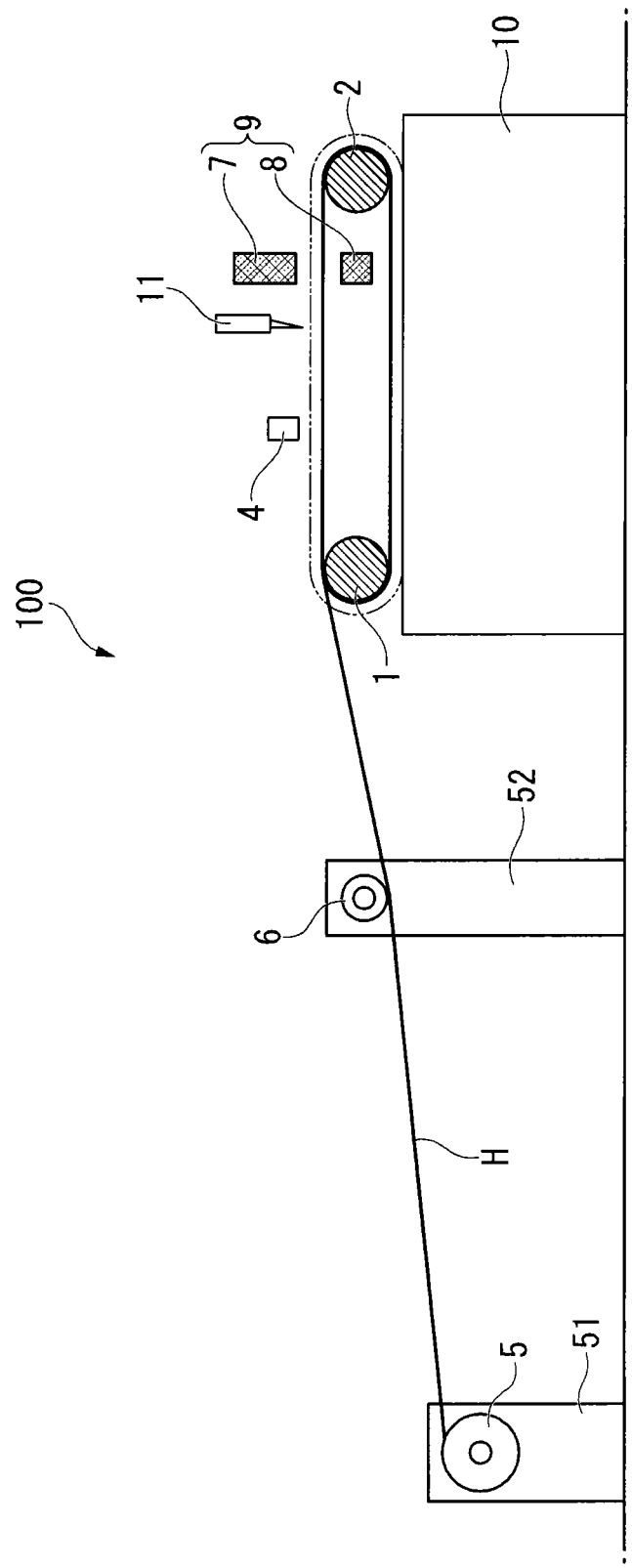
FIG. 1 is a schematic side view of a device for producing a hollow fiber membrane sheet-like object according to a first embodiment of the invention.

Hereinafter, a first embodiment of the invention will be described in detail referring to the drawings.

Figure 2:
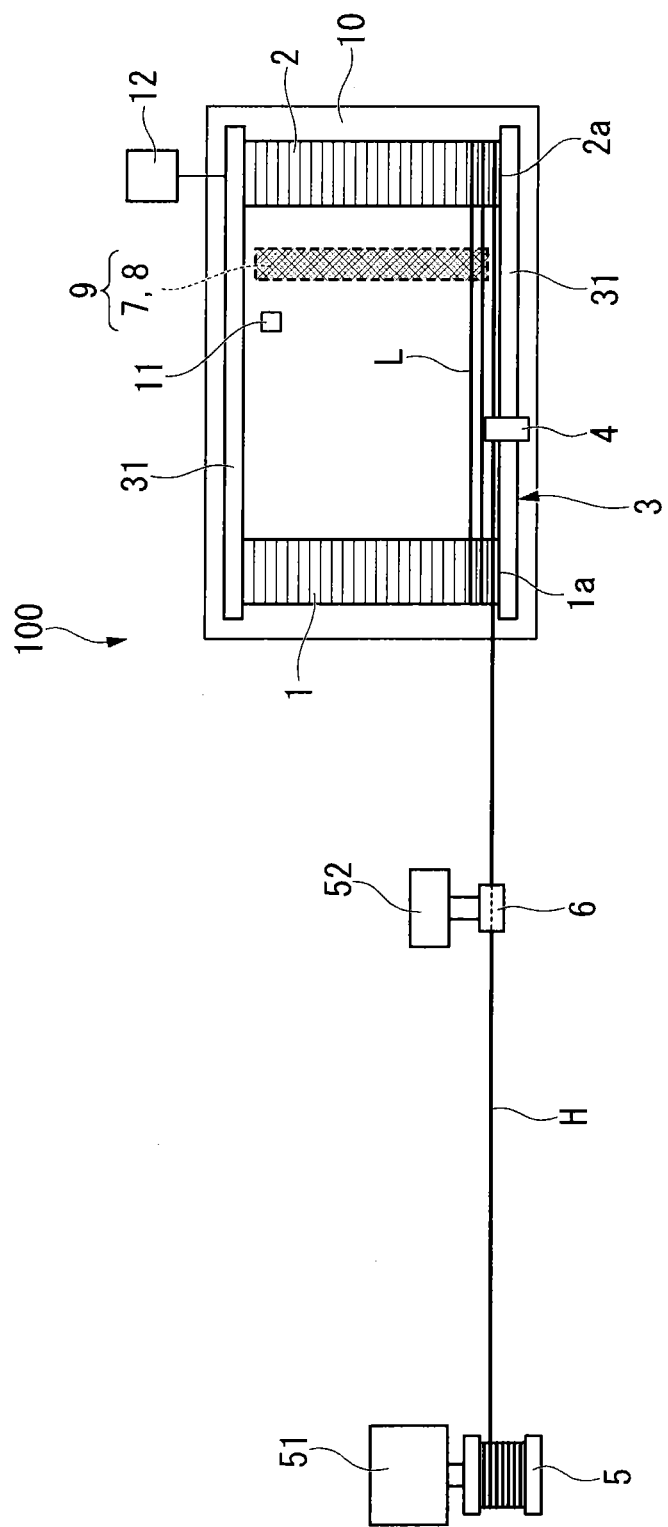
FIG. 2 is a schematic plan view of the device for producing a hollow fiber membrane sheet-like object according to the first embodiment of the invention.

FIG. 1 is a schematic side view of a device for producing a hollow fiber membrane sheet-like object according to the first embodiment of the invention. FIG. 2 is a schematic plan view of the device for producing a hollow fiber membrane sheet-like object.

As schematically shown in FIGS. 1 and 2, a device for producing a hollow fiber membrane sheet-like object 100 according to the invention is a device to process a hollow fiber membrane H which is supplied from a bobbin 5, into a hollow fiber membrane sheet-like object S (refer to FIG. 10) by winding the hollow fiber membrane H around a first roll 1 and a second roll 2 so as to span across the first roll 1 and the second roll 2, thereby making the form of a sheet, and then fixing and cutting each of the hollow fiber membranes H.

As the hollow fiber membrane H, for example, a cellulose-based hollow fiber membrane, a polyolefin-based hollow fiber membrane, polyvinylidene fluoride hollow fiber membrane, polyvinyl alcohol-based hollow fiber membrane, polymethyl methacrylate-based hollow fiber membrane, polysulfone-based hollow fiber membrane, or the like can be used. Further, a pore size, a porosity, a film thickness, an outer diameter, or the like of the hollow fiber membrane H is appropriately selected according to the intended use of the hollow fiber membrane sheet-like object S, whereby the hollow fiber membrane H can be chosen. Further, the hollow fiber membrane H can also be supplied in the form of a monofilament or can also be supplied in the form of a multifilament.

The device for producing a hollow fiber membrane sheet-like object 100 includes a frame 3 supported on a base 10. The framework-shaped frame 3 is configured to include two side frames 31 and 31 and shafts (not shown) provided so as to connect the two side frames 31 at the front end side and the rear end side of each side frame 31.

The first roll 1 and the second roll 2 (hereinafter also simply referred to as rolls) are respectively fixed to the shafts and rotatably mounted parallel to each other on bearings (not shown) mounted by two for each of the front end side and the rear end side of the frame 3. Materials of the rolls 1 and 2 are not particularly limited. However, it is preferable to perform finish machining on corner portions and the surfaces of the rolls 1 and 2 so as not to damage the surface of the hollow fiber membrane H. Further, it is preferable that it is difficult for a yarn to slip on the surfaces of the rolls. Here, in the frame 3, the first roll 1 is disposed on the bobbin 5 side and the second roll 2 is disposed on the opposite side to the bobbin 5.

The production device 100 is configured such that the hollow fiber membrane H is wound so as to span across the rolls 1 and 2. Hereinafter, a longitudinal direction of the hollow fiber membrane H wound around the rolls 1 and 2 is defined as a winding direction and a direction perpendicular to the longitudinal direction of the wound hollow fiber membrane H is defined as a width direction.

The distance between the first roll 1 and the second roll 2 (the distance between axes of the rolls) is appropriately set according to the length of the hollow fiber membrane sheet-like object S which is produced.

On the second roll 2, a motor 12 (driving means) which drives the second roll 2 is mounted. The motor 12 drives the second roll 2 such that the second roll 2 performs rotation to the right in the side view of FIG. 1. In other words, the motor 12 rotates the second roll 2 such that in a case where the hollow fiber membrane H is wound so as to span across the rolls 1 and 2, the hollow fiber membrane H on the upper side moves in a direction from the first roll 1 to the second roll 2 and the hollow fiber membrane H on the lower side moves in a direction from the second roll 2 to the first roll 1.

Further, on the front side of the first roll 1, the bobbin 5 is rotatably supported on a bobbin unwinding device 51. The hollow fiber membrane H in an amount sufficient to produce the hollow fiber membrane sheet-like object S having a predetermined area is wound on the bobbin 5, and it is possible to continuously supply the hollow fiber membrane H. The bobbin 5 is fixed so as to be immovable in the width direction at a position which is on a side where one end 1a and one end 2a (refer to FIG. 2) of the first roll 1 and the second roll 2 are located and sets a transport pathway of the hollow fiber membrane H.

Further, a guide roll 6 is provided in the transport pathway between the bobbin 5 and the frame 3. The guide roll 6 is rotatably supported on a roll stand 52. It is preferable that the guide roll 6 rotates at a peripheral speed equivalent to a transport speed of the hollow fiber membrane H. Although there is no limitation to a material of the guide roll 6, it is preferable to select a material in which static electricity is not easily generated in the hollow fiber membrane H.

The guide roll 6 is provided in order to supply the hollow fiber membrane H to appropriate positions of the rolls 1 and 2. In addition, if tension is appropriately given to the hollow fiber membrane H by the bobbin 5 described above and movement in a direction along the central axis of the bobbin 5, of the hollow fiber membrane H which is supplied from the bobbin 5, can be ignored, the guide roll 6 may be omitted.

If excessive tension is given, since the hollow fiber membrane H extends, thereby causing cutting in some cases, it is preferable that the tension be as small as possible in the range that there is no transfer of the hollow fiber membrane H to a neighboring groove due to flopping of the hollow fiber membrane H in a process, and in addition, it is preferable that the tension be appropriately adjusted according to the amount of winding of the hollow fiber membrane H wound on the bobbin 5 or the diameter or the film thickness of the hollow fiber membrane H.

As means for controlling tension, for example, a method to apply moderate braking to a rotating shaft (without driving) to which the bobbin 5 is fixed, or a method to install a dancer roll (not shown) between the bobbin 5 (with driving) and the guide roll 6 can be given. However, there is no limitation thereto.

Figure 3:
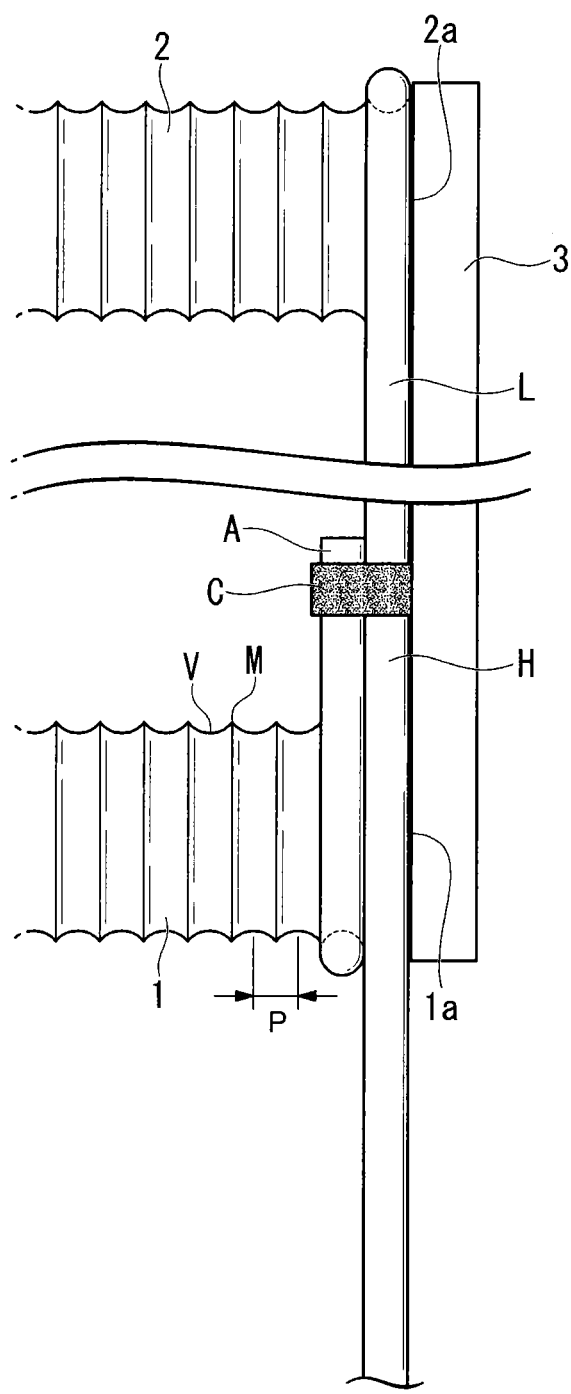
FIG. 3 is a plan view showing a state where a hollow fiber membrane is wound around a roll in the invention.

Further, in FIGS. 1 and 2, reference numeral 4 denotes a first ultrasonic welding machine (connecting means), and the first ultrasonic welding machine 4 has a function to form a connection section C by welding and fixing a leading end A of the hollow fiber membrane H to the hollow fiber membrane H itself, as shown in FIG. 3, in a state where the hollow fiber membrane H which is sent out from the bobbin 5 is wound around outer peripheral portions of the rolls 1 and 2 so as to surround the rolls 1 and 2 and so as not to overlap.

In the inside of the frame 3, an anvil 8 is provided between the first roll 1 and the second roll 2 and a horn 7 is disposed above the anvil 8, and a second ultrasonic welding machine 9 (fixing means) is configured by the horn 7 and the anvil 8.

The second ultrasonic welding machine 9 has a function to fix the hollow fiber membranes H into the form of a sheet over the width directions of the two rolls 1 and 2 (a direction perpendicular to the longitudinal direction of the hollow fiber membrane H). In this embodiment, two fixed sections B (refer to FIG. 8) are formed at a predetermined interval in a transport direction of the hollow fiber membrane. In this case, the fixing means may have a mechanism capable of forming two fixed sections at a time and may also have a configuration in which after one place is fixed at a desired position, the hollow fiber membrane is transported by an amount approximately corresponding to the width of a fixed section by rotating a roll, and then, a fixed section is formed again. Further, if the second ultrasonic welding machine 9 is configured so as to be movable in the winding direction by a driving device (not shown), even if the hollow fiber membrane H is in a stopped state, it is possible to allow different places to be welded. In addition, at a place which is welded, the shape (the hollow shape) of the hollow fiber membrane H need not be maintained.

Further, in FIG. 1, reference numeral 11 denotes an ultrasonic cutter (cutting means), and the ultrasonic cutter 11 is for cutting in the width direction an area between the two fixed sections B formed at a predetermined interval in the transport direction of the hollow fiber membrane by the second ultrasonic welding machine 9.

As shown in FIG. 3, each of the first roll 1 and the second roll 2 has two or more circumferential grooves which are configured by mountain portions M and valley portions V densely formed in a parallel fashion at the same pitch P, and arranged in the width direction. The grooves are formed independently of each other, rather than being spirally formed. The pitch P of the groove is determined depending on the diameter of the hollow fiber membrane H and desired integration density of the hollow fiber membranes in a desired hollow fiber membrane sheet-like object. However, if the pitch P is set to be wide by a round (1% to 3%) or more with respect to the diameter of the hollow fiber membrane H, it is preferable in that introduction of the hollow fiber membrane into a grooved roll in a production process which will be described later becomes smoother and deterioration in quality, a shift, entanglement, or the like due to contact between the hollow fiber membranes which are adjacently transported is also not easily generated.

In addition, the shape of the groove is not limited to a shape in which a shape viewed from the side depicts an arc, as shown in FIG. 3, and may be, for example, a shape in which the mountain portion M and the valley portion V are linearly connected and may also be a shape in which a groove bottom is flat. Since the hollow fiber membrane H and the groove come into closer contact with each other by making a groove portion have a shape depicting an arc, as in this embodiment, it is preferable.

In addition, as for the first roll 1 and the second roll 2, rolls having no groove can also be used. In this case, since the hollow fiber membrane can be more stably wound in the form of a sheet by making the diameter of the roll slightly large in the winding direction or slightly shifting the axes of two or more rolls at an arbitrary angle from parallel, it is preferable.

Figure 4:
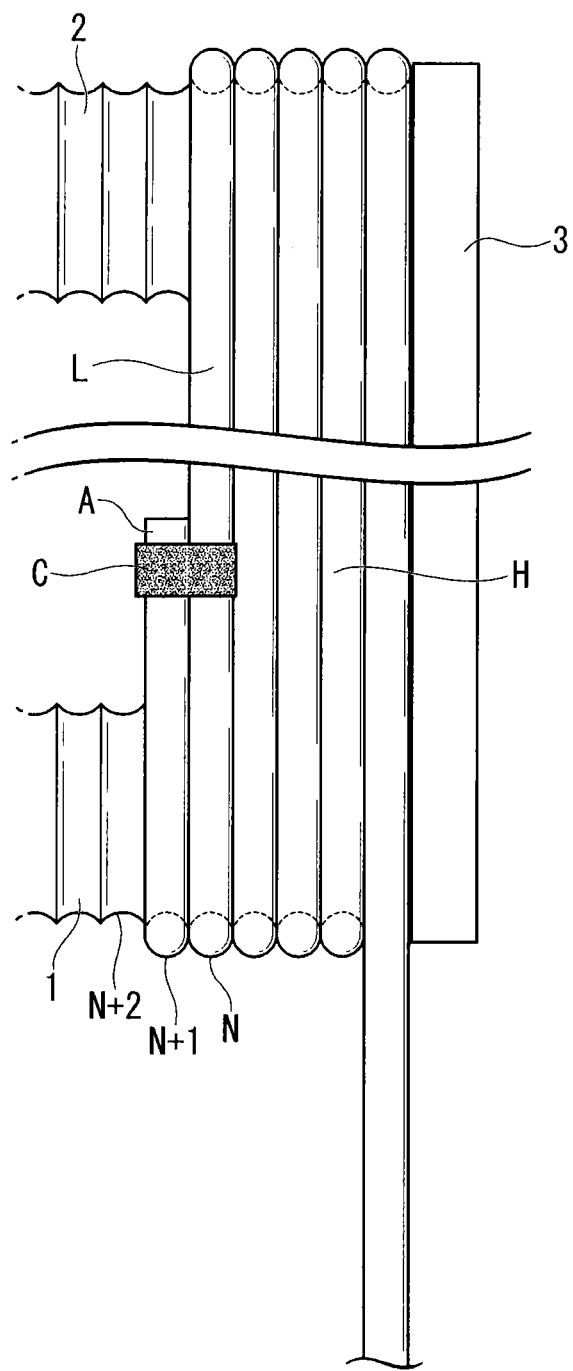
FIG. 4 is a plan view showing a state where the hollow fiber membrane is wound around the roll in the invention.
Figure 5:
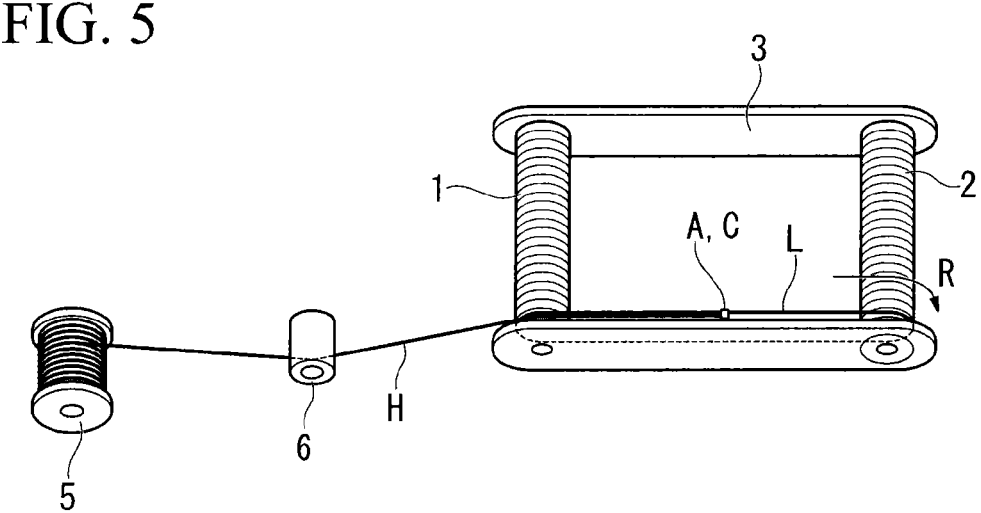
FIG. 5 is a diagram showing a production process according to the first embodiment of the invention.
Figure 6:
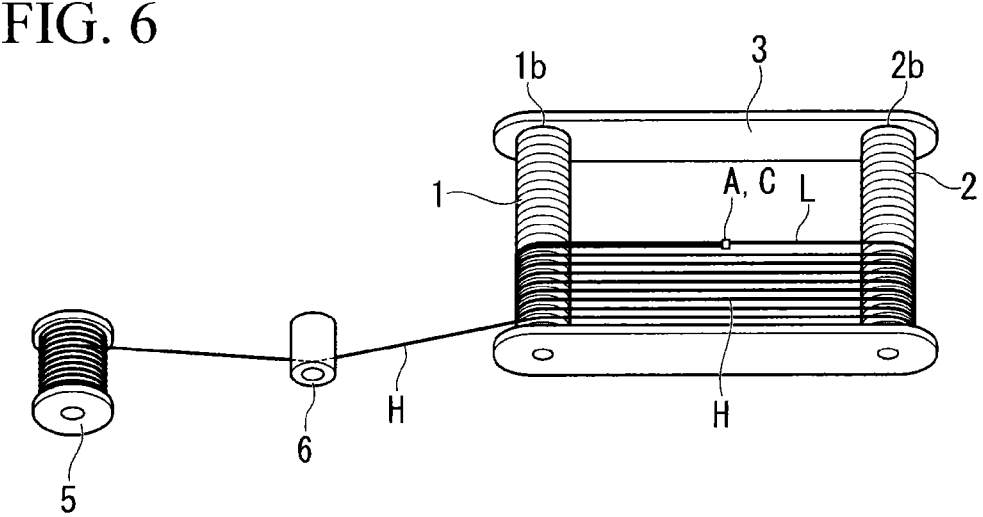
FIG. 6 is a diagram showing the production process according to the first embodiment of the invention.
Figure 7:
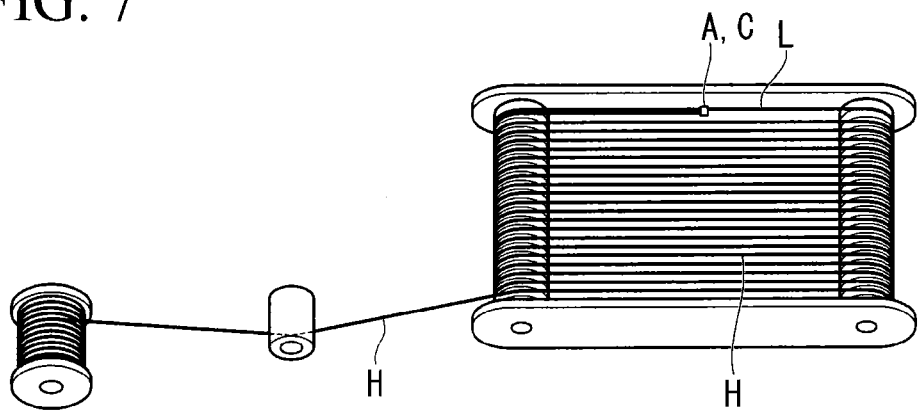
FIG. 7 is a diagram showing the production process according to the first embodiment of the invention.

Next, a method for producing a hollow fiber membrane sheet-like object using the device for producing a hollow fiber membrane sheet-like object 100 will be described in detail referring to the drawings. FIGS. 3 and 4 are plan views showing a state where the hollow fiber membrane is wound around the rolls in the invention. FIGS. 5 to 7 are diagrams showing a production process according to an embodiment of the invention.

First, as shown in FIGS. 3 and 5, after the hollow fiber membrane H is wound by one round so as to surround the rolls 1 and 2 and so as not to overlap, the vicinity of the leading end A of the hollow fiber membrane H is welded and fixed just beside (1b and 2b side) the first hollow fiber membrane H previously wound, by using the first ultrasonic welding machine 4 (refer to FIGS. 1 and 2), whereby the connection section C is formed. In this way, a hollow fiber membrane loop L is formed. When fixing an end portion of the hollow fiber membrane H, fixing is performed such that moderate tension is given to the hollow fiber membrane loop L. It is preferable that the tension be as small as possible in the range that there is no transfer of the hollow fiber membrane loop L to a neighboring groove due to flopping of the hollow fiber membrane H in a production process, and it is preferable that the tension be appropriately adjusted according to the diameter or the film thickness of the hollow fiber membrane H. Further, the hollow fiber membrane loop L is wound in the groove such that the hollow fiber membrane H is supplied approximately perpendicular to the rolls 1 and 2 (that is, approximately straight with respect to the groove).

Next, the motor 12 is driven, whereby the second roll 2 is rotated, thereby starting winding of the hollow fiber membrane H. The hollow fiber membrane H rotates in a direction of an arrow shown by sign R in FIG. 5 according to the rotation of the second roll 2.

As shown in FIG. 4, the leading end A of the yarn is led to an N+1-th groove while being accompanied by the just before (N-th) hollow fiber membrane H which is fitted in an N-th groove shown by sign N and self-propels. Also in rotation to the back side, similarly, the leading end A of the hollow fiber membrane is led to an N+2-th groove while being accompanied by the just before (N+1-th) hollow fiber membrane H fitted in the N+1-th groove. Continuously, the second roll 2 continues to rotate, whereby the leading end A and the hollow fiber membrane loop L move and the hollow fiber membrane H which is drawn out from the bobbin 5 is wound around the rolls 1 and 2.

In addition, as shown in FIG. 6, also in a case where the hollow fiber membrane loop L moves to the other end 1b and other end 2b sides of the rolls 1 and 2, a position where the hollow fiber membrane H is supplied from the bobbin 5 does not change. That is, it is not necessary to move a supply position of the hollow fiber membrane H.

As shown in FIG. 7, winding is completed at a stage in which the hollow fiber membrane loop L reaches the groove formed on the other most end side, or at a stage in which the width of the sheet-shaped hollow fiber membrane H reaches the width or the number of yarns of a desired hollow fiber membrane sheet-like object S. The first roll 1 and the second roll 2 have the grooves formed at the same pitch P, whereby yarn pitches of the hollow fiber membranes H constituting the hollow fiber membrane sheet-like object S can be more evenly aligned.

Figure 8:
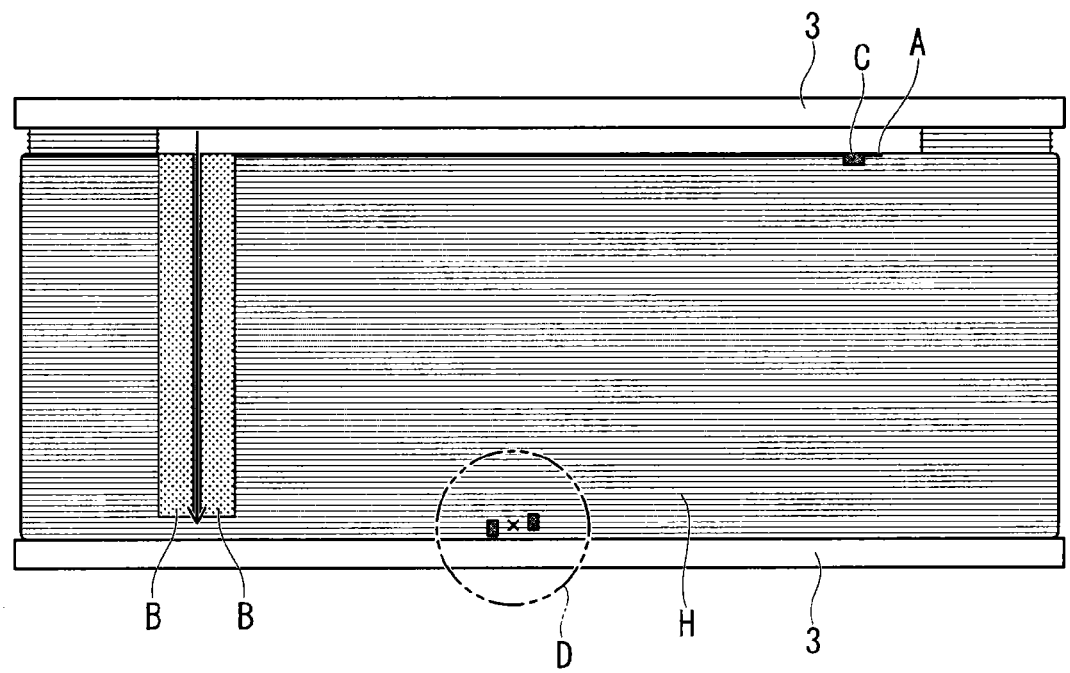
FIG. 8 is a diagram showing the production process according to the first embodiment of the invention and a diagram describing a method of fixing a hollow fiber membrane sheet-like object.

Next, a process of fixing the hollow fiber membrane sheet-like object S after completion of winding of the hollow fiber membrane H will be described. FIG. 8 is a diagram describing a method of fixing the hollow fiber membrane sheet-like object and FIG. 9 is a partial enlarged view of a portion shown by D in FIG. 8.

Figure 9:
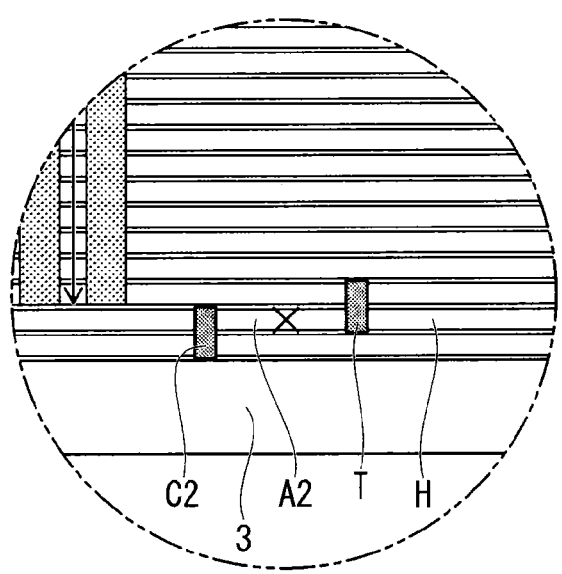
FIG. 9 is an enlarged view of a portion of FIG. 8.

After completion of the winding, as shown in FIG. 9, the hollow fiber membrane H which is located on the one most end 1a and one most end 2a sides, among the wound hollow fiber membranes H, is fixed at a connection section shown by sign C2, thereby providing a leading end A2 of the next hollow fiber membrane sheet-like object S (a second hollow fiber membrane sheet-like object). Subsequently, a terminus section shown by sign T, of the hollow fiber membrane H constituting the hollow fiber membrane sheet-like object S (a first hollow fiber membrane sheet-like object) which is taken out, is fixed, and an area between the connection section C2 and the terminus section T is cut.

Next, the hollow fiber membranes H are welded to each other at two places, as shown by sign B in FIG. 8, by using the second ultrasonic welding machine 9 shown in FIG. 1, whereby fixed sections are formed. At this time, it is preferable to weld a place except for the hollow fiber membranes H constituting the second hollow fiber membrane sheet-like object.

Figure 10:
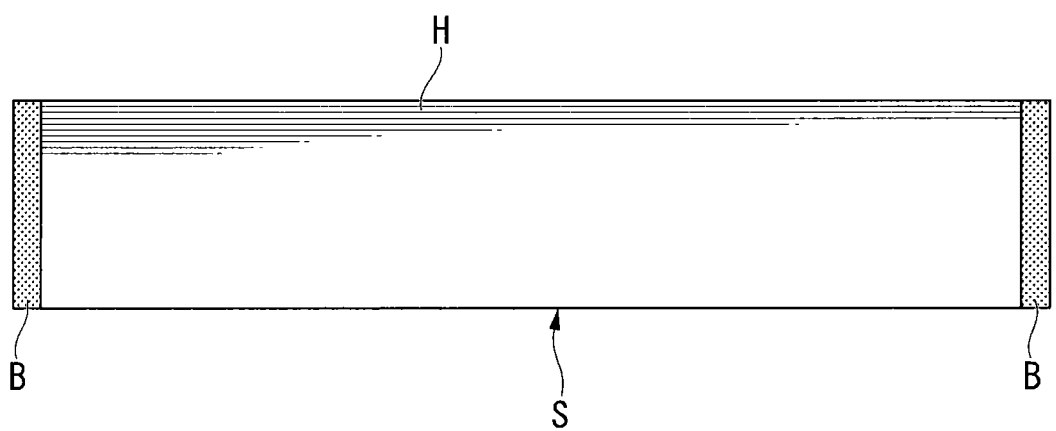
FIG. 10 is a plan view showing the hollow fiber membrane sheet-like object.

After the welding, the ultrasonic cutter 11 (the cutting means) shown in FIG. 1 is moved in the width direction, thereby cutting an area between the two fixed sections B, that is, a place except for the hollow fiber membranes H constituting the second hollow fiber membrane sheet-like object, and the first hollow fiber membrane sheet-like object is removed from the rolls 1 and 2, whereby the hollow fiber membrane sheet-like object S as shown in FIG. 10 is obtained.

The hollow fiber membrane sheet-like object S (the first hollow fiber membrane sheet-like object) is taken out from the state as shown in FIG. 8, whereby return to the same state as in FIG. 3 is performed, and continuously, production of the hollow fiber membrane sheet-like object S (the second hollow fiber membrane sheet-like object) becomes possible.

In this manner, the embodiment is a configuration in which the hollow fiber membrane H is wound so as to span across the two rolls 1 and 2, and the positions of the central axes of the two rolls 1 and 2 are fixed. Accordingly, it becomes possible to dispose a receiving tool of the welding machine between the two rolls 1 and 2, and more reliable fixing can be realized by a simpler configuration.

Figure 11:
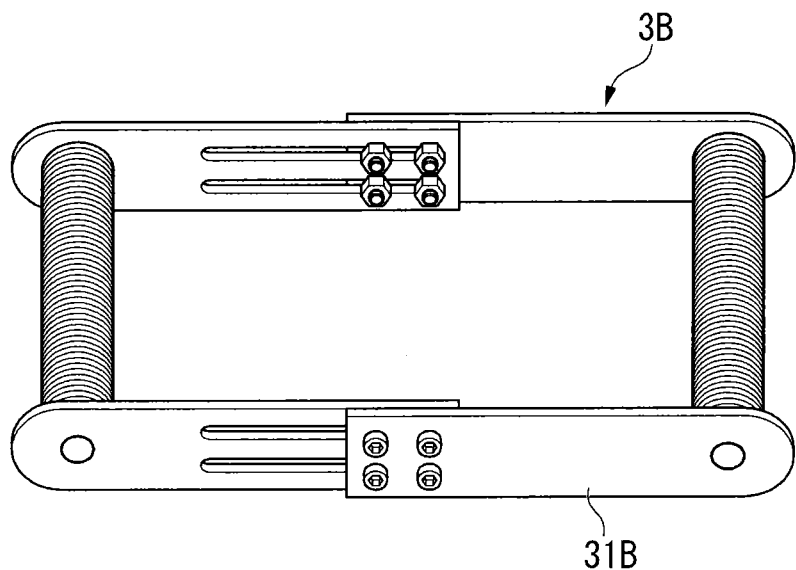
FIG. 11 is a perspective view showing a case where the length of a frame is lengthened in a side frame having an adjustable length.
Figure 12:
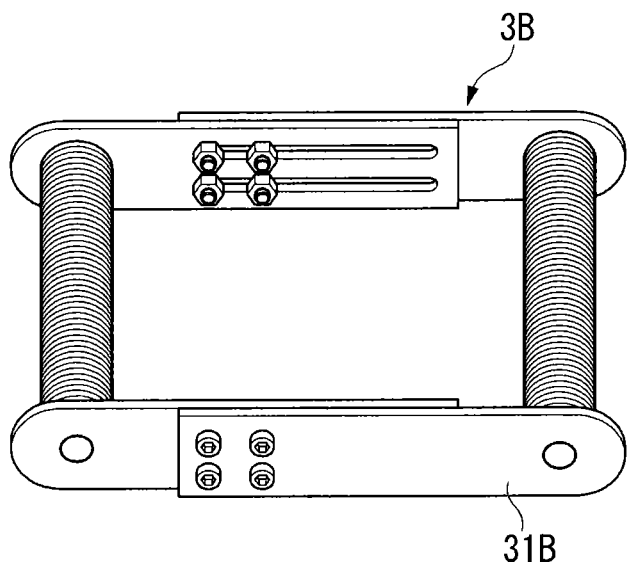
FIG. 12 is a perspective view showing a case where the length of the frame is shortened in the side frame having an adjustable length.

Further, when changing the length of the hollow fiber membrane sheet-like object S which is produced, the length of the hollow fiber membrane sheet-like object S is easily changed by adopting a configuration capable of adjusting the length of a frame 3B in order to adjust a winding peripheral length, as shown in, for example, FIGS. 11 and 12, without changing the rolls 1 and 2. Here, the winding peripheral length means the length between two or more rolls after the hollow fiber membrane is wound. The frame 3B shown in FIG. 11 is configured to include a side frame 31B in which a change in length can be made by a fixing place, and the length of the frame 3B can be changed by deformation from a state as shown in FIG. 11 to a state as shown in FIG. 12. If sheet cutting work is performed with tension being strong, there is a case where a problem such as cracking of a welded section (a connection section or a fixed section) arises. For this reason, by loosening tension by adopting a frame in which a change in length is possible, the above problem can be solved and sheet collecting work becomes easy.

In addition, the winding peripheral length can also be indirectly regulated by putting, for example, a non-rotatable shaft between two or more rolls, winding the hollow fiber membrane so as to be wound around the outer peripheries of the two or more rolls and the shaft, and then removing the shaft.

Figure 13:
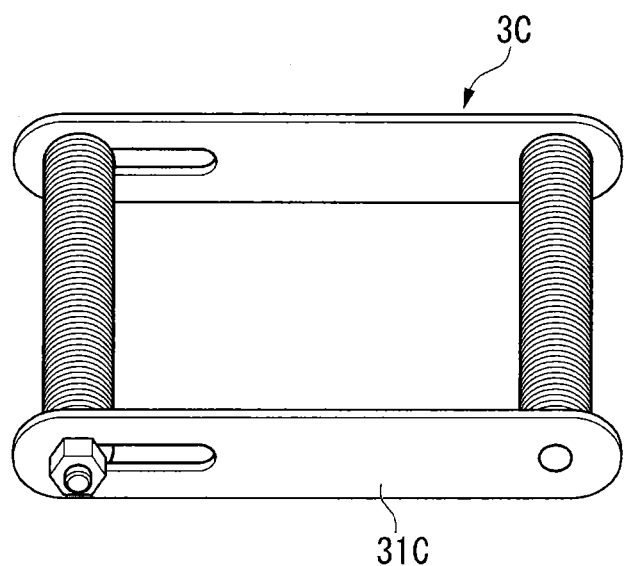
FIG. 13 is a perspective view showing a case where the distance between rolls is lengthened in a side frame in which the position of a roll can be adjusted.
Figure 14:
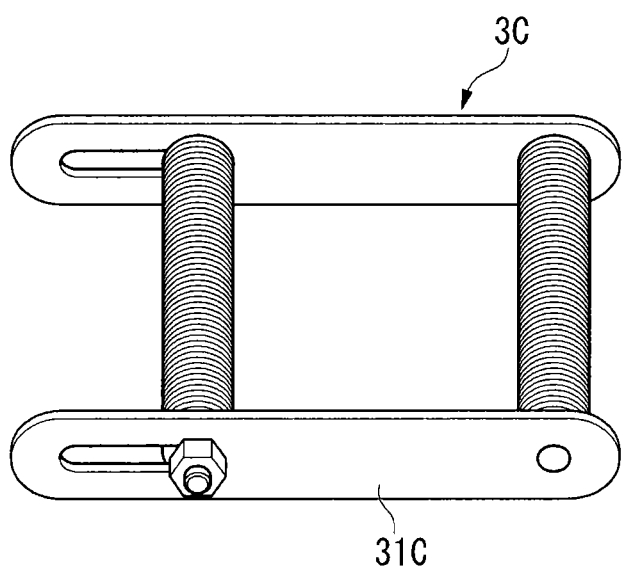
FIG. 14 is a perspective view showing a case where the distance between the rolls is shortened in the side frame in which the position of a roll can be adjusted.

Further, regulating means for regulating the distance between two rolls, as shown in FIGS. 13 and 14, can also be adopted. The distance between the rolls is shortened by moving the position of the roll on one side from a state shown in FIG. 13 to a state shown in FIG. 14, whereby tension of a hollow fiber membrane sheet-like object can be loosened and hollow fiber membrane sheet-like object collecting work becomes easy. A movement distance of the roll is appropriately selected according to the winding tension, the degree of elongation of the hollow fiber membrane, the strength of the welded section, or the like.

Further, since the above-described embodiment has a configuration in which the hollow fiber membrane H is wound around the outer peripheral portions of the rolls 1 and 2 by moving a leading end portion thereof, it is not necessary to provide a traversing mechanism in the guide roll 6, and if appropriate tension can be given to the hollow fiber membrane H and a change in the yarn feeding angle of the hollow fiber membrane H which is supplied from the bobbin 5 can be ignored, the guide roll 6 itself becomes unnecessary.

Further, in the above-described embodiment, a configuration is adopted in which the hollow fiber membrane H is wound around the rolls 1 and 2 by rotating only the second roll 2. However, a configuration is also possible in which the first roll 1 is rotated along with the second roll 2. More stable winding becomes possible by driving the first roll 1 at the same rotating speed as that of the second roll 2.

Figure 15:
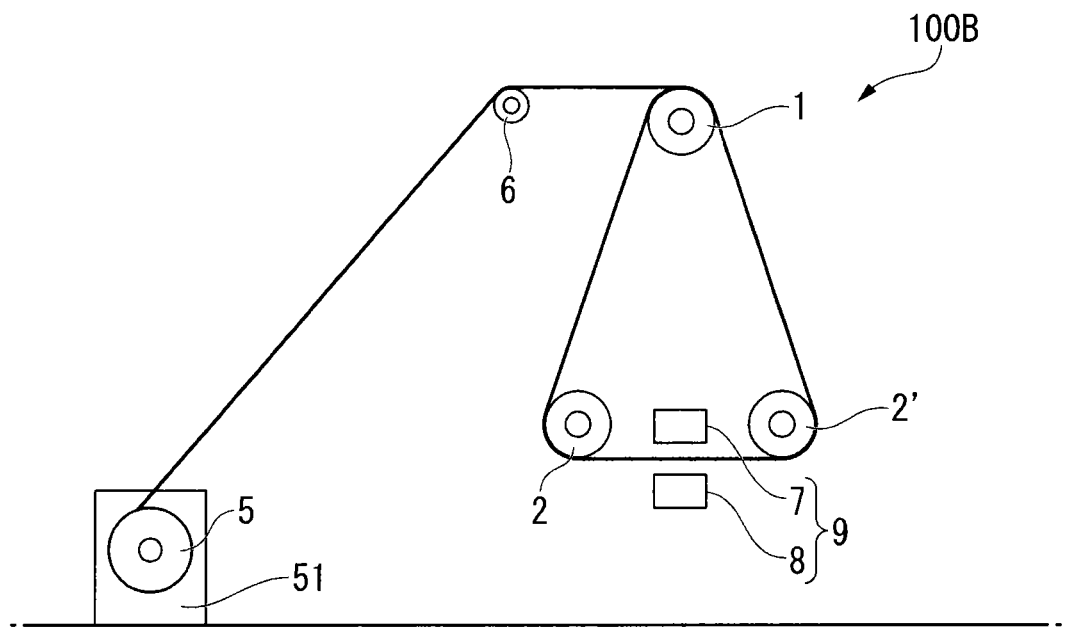
FIG. 15 is a schematic side view of a device for producing a hollow fiber membrane sheet-like object, in which three rolls are disposed.
Figure 16:
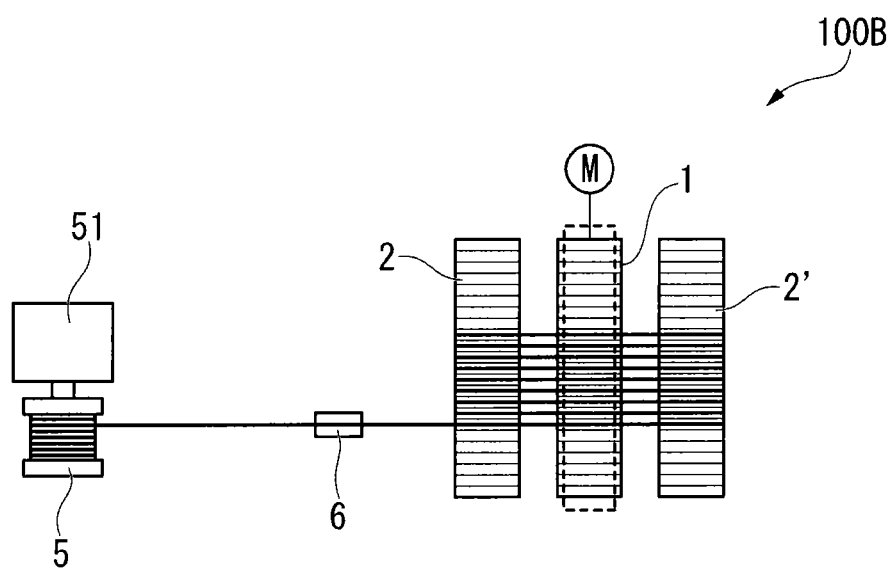
FIG. 16 is a schematic plan view of the device for producing a hollow fiber membrane sheet-like object, in which three rolls are disposed.

Further, the number of rolls is not limited to two, and a configuration is also possible in which in addition to the first roll 1 and the second roll 2, other rolls such as a third roll and a fourth roll are provided. FIG. 15 is a schematic side view of a device 100B for producing the hollow fiber membrane sheet-like object S, in which three rolls are disposed, and FIG. 16 is a schematic plan view thereof. In the drawings, the three rolls are disposed in a parallel fashion. By adopting such a configuration, slack of the hollow fiber membrane due to the force of gravity is effectively suppressed, similar to a fourth embodiment which will be described later. Further, space-saving is obtained and it is also possible to easily dispose the fixing means. In the drawings, a case of supplying a single hollow fiber membrane is illustrated. However, as in a third embodiment which will be described later, a plurality of hollow fiber membranes may also be supplied in a juxtaposition state.

Further, the fixing method is not limited to the ultrasonic welding as described above, in a case where the hollow fiber membranes H arranged in the form of a sheet have been cut out, the hollow fiber membranes H are not dispersed. For example, fixing by thermal fusion bonding, a tape, or an adhesive, specifically, fixing by a welding machine by heat of an impulse heater or the like, a tape feeder, an adhesive coater, or a jig, or the like is also acceptable.

Figure 17:
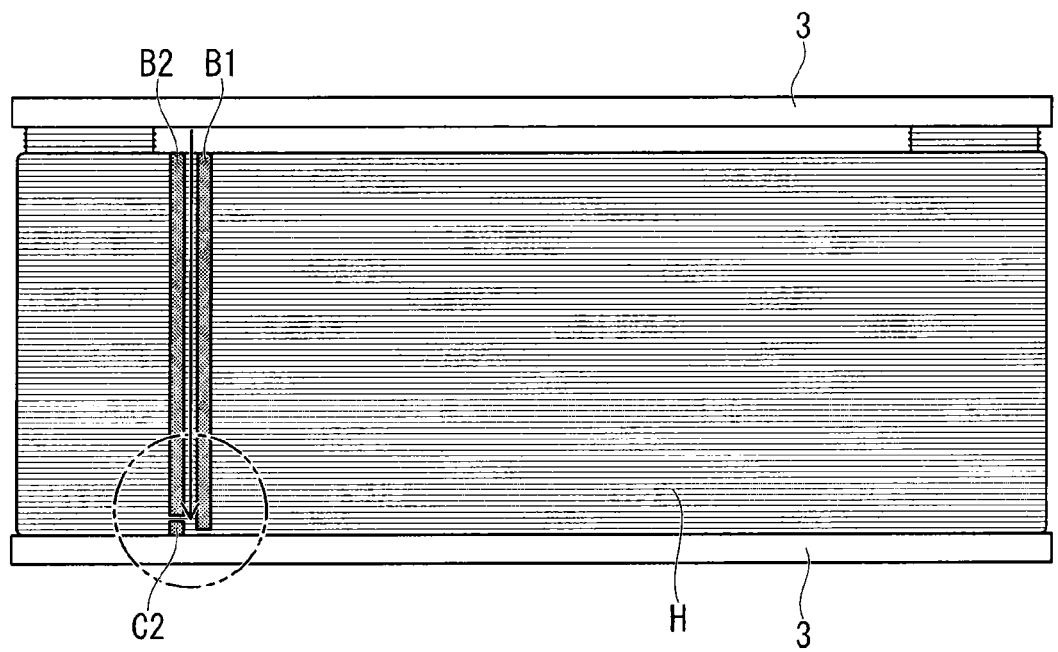
FIG. 17 is a diagram showing the production process according to the first embodiment of the invention and a diagram describing another method of fixing a hollow fiber membrane sheet-like object.
Figure 18:
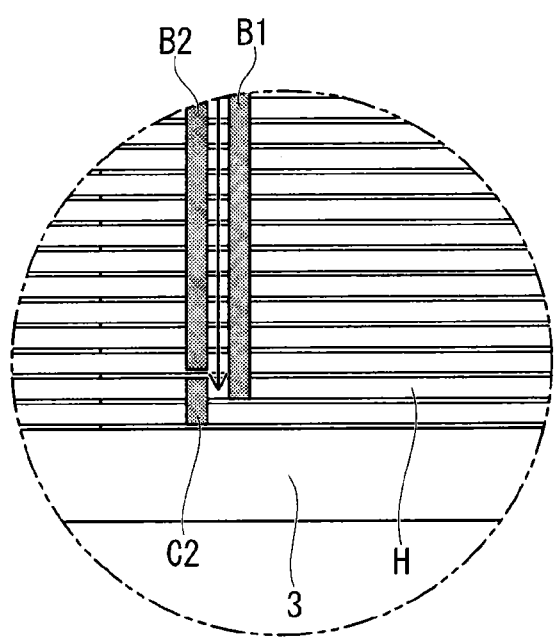
FIG. 18 is an enlarged view of a portion of FIG. 17.

Further, a sheet fixing process can be simplified by welding positions as shown by signs B1, B2, and C2 in FIGS. 17 and 18.

In the sheet fixing process shown in FIGS. 8 and 9, the terminus section T and the connection section C2 are provided at independent positions with respect to the fixed sections B. In contrast to this, a fixed section shown by sign B1 fixes an end portion of the hollow fiber membrane sheet-like object S and also fixes a terminus section (equivalent to the terminus section T in FIG. 9) of the hollow fiber membrane H. Further, a fixed section shown by sign B2 and the connection section shown by sign C2 are disposed on the same line. Since the fixing process can be simplified by disposing the fixed sections B1 and B2 in this manner, the time it takes to perform a process of collecting the hollow fiber membrane sheet-like object S can be shortened.

Further, a method is also acceptable in which the fixed section B is set to be in one place and the hollow fiber membrane sheet-like object S is obtained by cutting out an approximately central portion of the fixed section B. In this way, it is possible to obtain the hollow fiber membrane sheet-like object S in which the fixed sections B are provided at both end portions of the hollow fiber membrane sheet-like object S.

In addition, the cutting method is not limited to the ultrasonic cutter 11 as described above. For example, cutting can be performed by not only cutting with an edged tool, scissors, or a rotating blade, but also using meltdown with a heater wire, a laser cutter, or the like. Further, a cutting line formed by cutting need not be a straight line.

Figure 19:
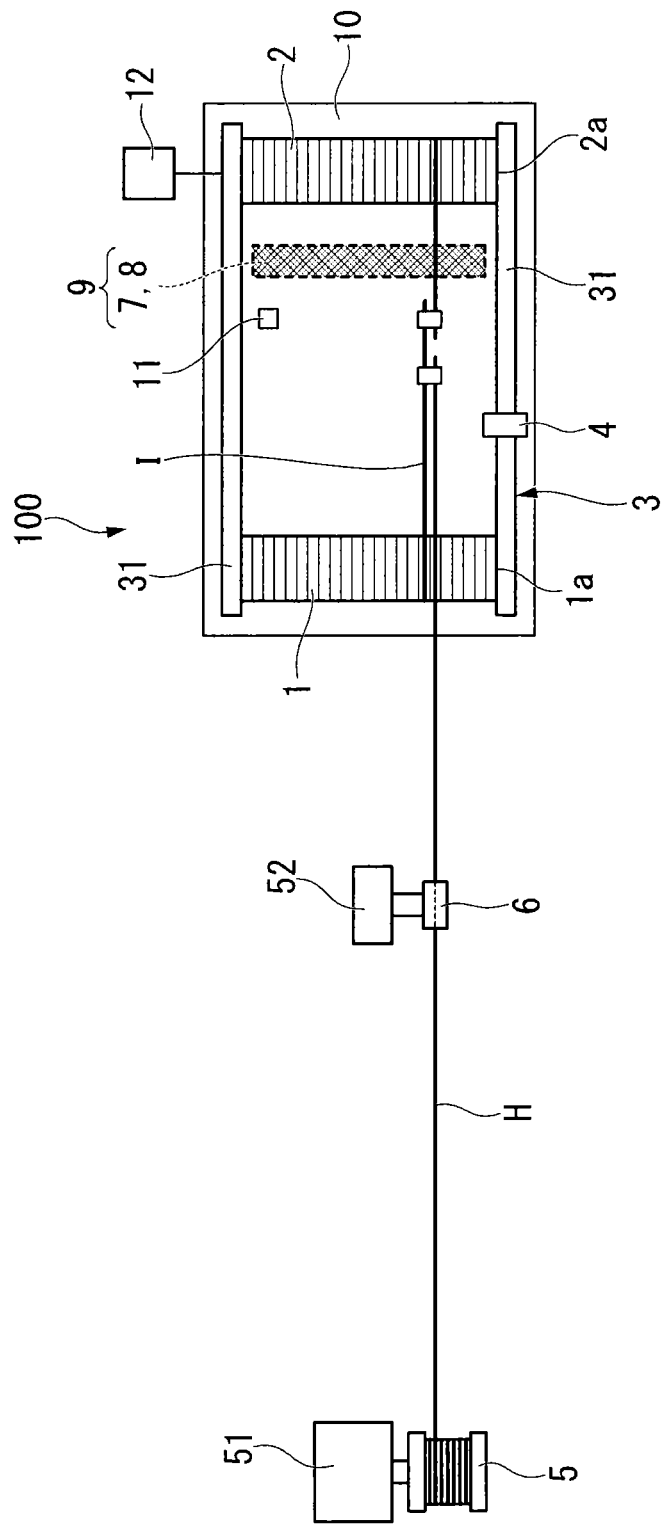
FIG. 19 is a diagram showing an example of a method of forming a connection section.

Further, in this embodiment, a ring-shaped section is formed by winding the hollow fiber membrane capable of being continuously supplied, around the two or more rolls so as to surround the rolls and so as not to overlap, and connecting the leading end portion of the wound hollow fiber membrane to an adjacent hollow fiber membrane. However, as shown in FIG. 19, a method can also be adopted in which a ring-shaped member I is put on outer peripheral portions of two or more rolls in advance and the ring-shaped member I is connected to a leading end portion A of a hollow fiber membrane.

The ring-shaped member I may be a hollow fiber membrane and may also be another fibrous object having, for example, a tube shape or a string shape.

Figure 20:
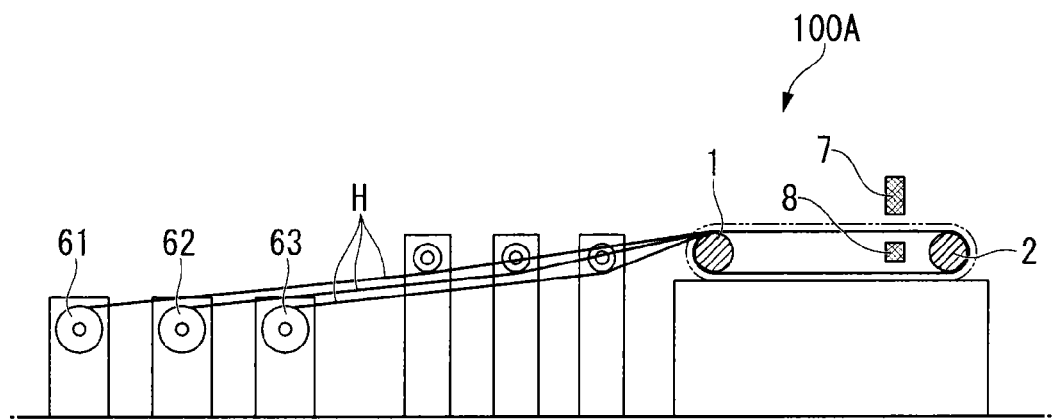
FIG. 20 is a schematic side view of a device for producing a hollow fiber membrane sheet-like object according to a second embodiment of the invention.
Figure 21:
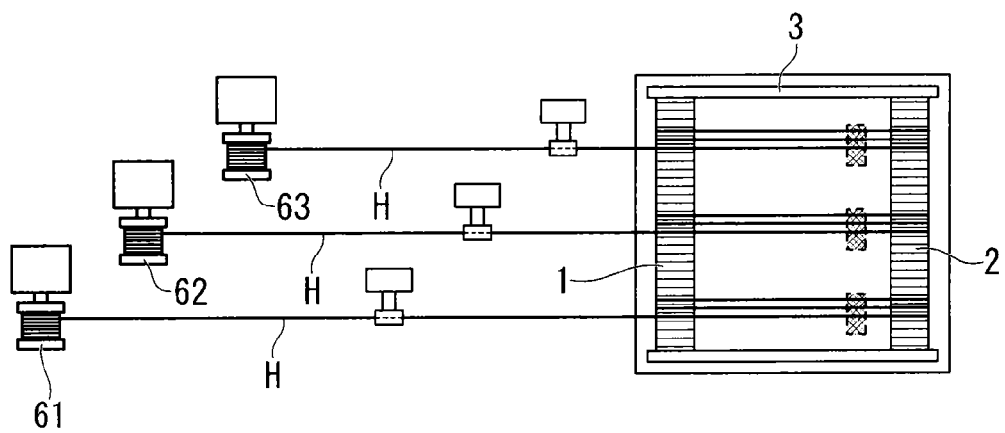
FIG. 21 is a schematic plan view of the device for producing a hollow fiber membrane sheet-like object according to the second embodiment of the invention.

Next, a second embodiment of the device for producing a hollow fiber membrane sheet-like object according to the invention will be described. FIG. 20 is a schematic side view of the device for producing a hollow fiber membrane sheet-like object according to the second embodiment of the invention, and FIG. 21 is a schematic plan view of the device for producing a hollow fiber membrane sheet-like object according to the second embodiment of the invention.

In addition, in this embodiment, description will be performed focusing on different points between this embodiment and the above-described embodiment, and with respect to the same section, description thereof is omitted.

In a device for producing a hollow fiber membrane sheet-like object 100A according to this embodiment, there are provided three bobbins which supply the hollow fiber membranes H. Bobbins 61, 62, and 63 are disposed so as to be able to supply the hollow fiber membranes H in a state of being spaced apart from each other in a direction along the longitudinal directions of the rolls 1 and 2.

The production device 100A according to this embodiment has a configuration capable of independently supplying three hollow fiber membranes H, thereby being able to produce three hollow fiber membrane sheet-like objects S at the same time.

In addition, the above-described embodiment has a configuration capable of producing three hollow fiber membrane sheet-like objects S at the same time. However, there is no limitation thereto and the number of hollow fiber membrane sheet-like objects S which can be produced at the same time can be appropriately changed according to the width dimension of a desired hollow fiber membrane sheet-like object S or the lengths of the rolls 1 and 2.

Next, a third embodiment of the invention will be described based on the drawings.

Figure 22:
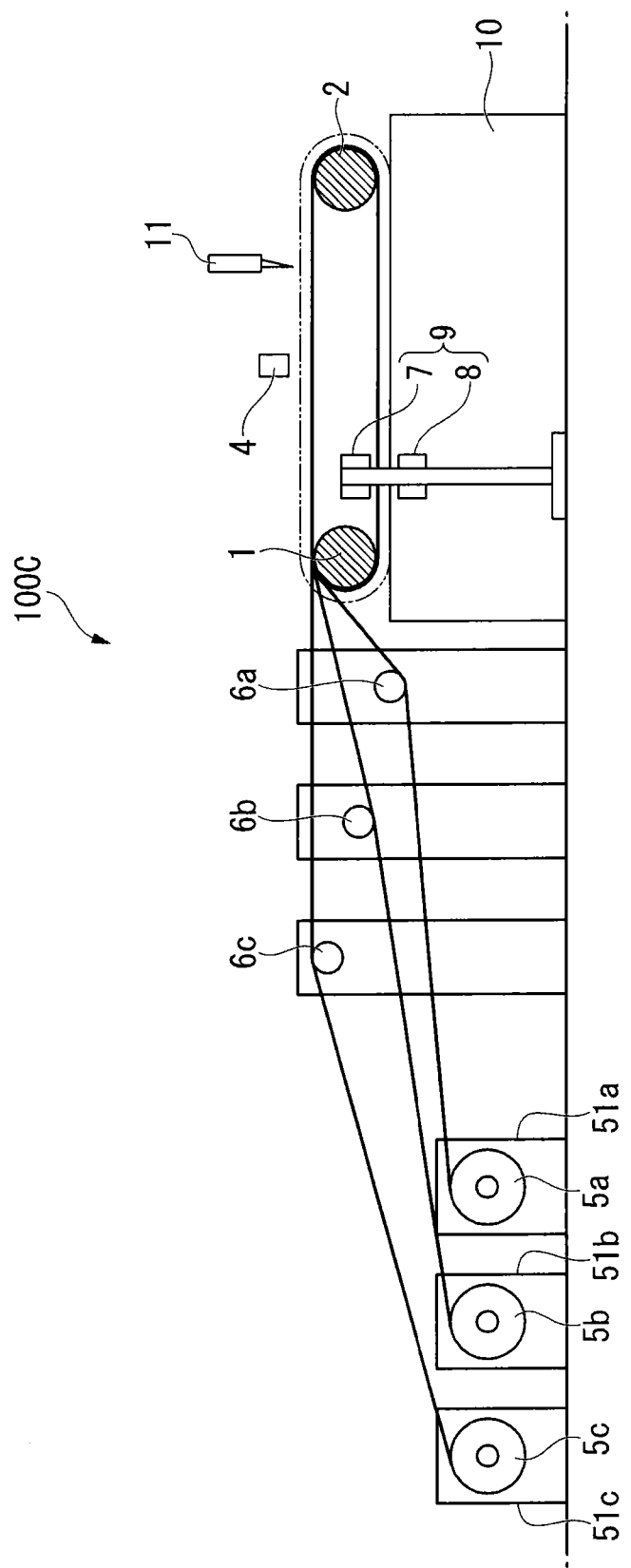
FIG. 22 is a schematic side view of a device for producing a hollow fiber membrane sheet-like object according to a third embodiment of the invention.
Figure 23:
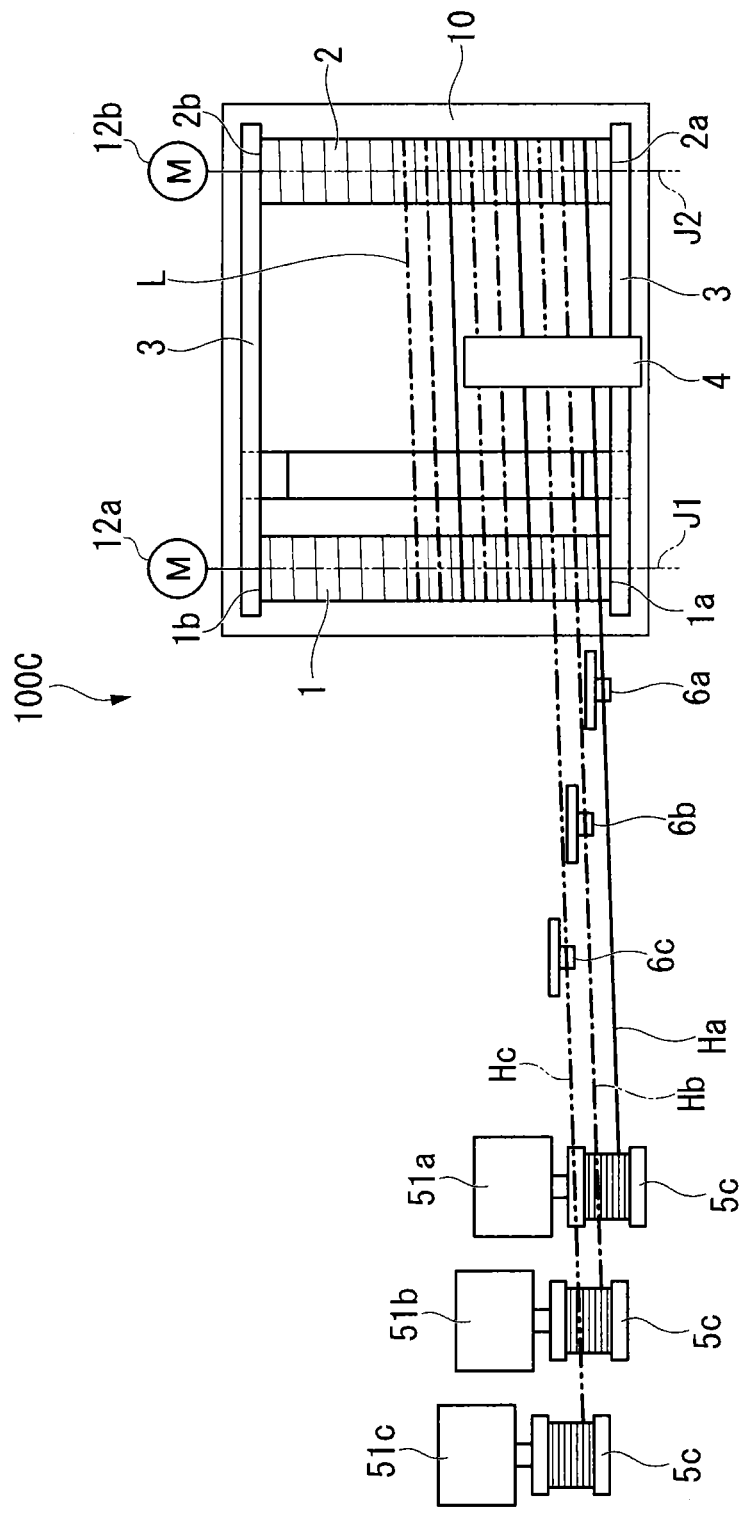
FIG. 23 is a schematic plan view of the device for producing a hollow fiber membrane sheet-like object according to the third embodiment of the invention.

FIG. 22 is a schematic side view of a device 100C for producing the hollow fiber membrane sheet-like object S, and FIG. 23 is a schematic plan view of the device 100C for producing the hollow fiber membrane sheet-like object S.

As shown in FIGS. 22 and 23, the device 100C for producing the hollow fiber membrane sheet-like object S is a device to process hollow fiber membranes Ha, Hb, and Hc which are respectively supplied from a plurality of (in this embodiment, three) bobbins 5a, 5b, and 5c, into the hollow fiber membrane sheet-like object S (refer to FIG. 10) by winding the hollow fiber membranes Ha, Hb, and Hc around the first roll 1 and the second roll 2 so as to span across the first roll 1 and the second roll 2 and surround the rolls 1 and 2, thereby making the form of a sheet, and then fixing and cutting the hollow fiber membranes Ha, Hb, and Hc.

In the third embodiment, a ring-shaped section forming process is for forming a ring-shaped section and a connection section by supplying the plurality of hollow fiber membranes (Ha, Hb, and Hc) to one-end sides in the width direction of the respective rolls (the first roll 1 and the second roll 2) still in a juxtaposition state, winding the plurality of hollow fiber membranes so as to surround the respective rolls, while shifting leading end portions of the plurality of hollow fiber membranes to the other end sides still in a juxtaposition state, and connecting the leading end portions of the plurality of hollow fiber membranes to the plurality of hollow fiber membranes supplied to the one-end sides in the width direction and adjacent to each other, still in a juxtaposition state, wherein a winding process is for winding the plurality of hollow fiber membranes around outer peripheral portions of the respective rolls by moving the leading end portions of the plurality of hollow fiber membranes by rotating at least one roll of the respective rolls, a fixing process is for forming a fixed section by fixing the plurality of hollow fiber membranes wound by the winding process, still in a juxtaposition state, and a cutting process is for cutting out the plurality of hollow fiber membranes along the fixed section.

Due to such a configuration, a traversing mechanism is unnecessary and the production device can be constructed with a simple configuration.

In addition, by supplying a plurality of hollow fiber membranes at a time, it is possible to shorten time to be taken while a hollow fiber membrane sheet-like object is formed in a desired width.

For this reason, it becomes possible to quicken the production speed of the hollow fiber membrane sheet-like object.

Then, as means for fixing the hollow fiber membranes into the form of a sheet, it becomes possible to adopt fixing means for fixing the hollow fiber membranes disposed in parallel in a row at a desired pitch, from both sides with the hollow fiber membranes interposed therebetween.

As the hollow fiber membranes Ha, Hb, and Hc, the same hollow fiber membranes as that illustrated by the hollow fiber membrane H can be used.

The first roll 1 and the second roll 2 are rotatably supported on both end sides in the longitudinal direction of the framework-shaped frame 3 such that axes of rotation J1 and J2 thereof are parallel to each other. The frame 3 is fixed to the base 10.

A material of each of the rolls 1 and 2 is not particularly limited. However, it is preferable to perform finish machining on corner portions and surfaces so as not to damage the surfaces of the hollow fiber membranes Ha, Hb, and Hc.

Further, the distance between the first roll 1 and the second roll 2 is made so as to be appropriately set according to the length of the hollow fiber membrane sheet-like object S which is produced.

In addition, motors 12a and 12b which drive the rolls 1 and 2 are respectively on the first roll 1 and the second roll 2. Each of the motors 12a and 12b drives each of the rolls 1 and 2 such that each of the rolls 1 and 2 performs rotation to the right in FIG. 22. In other words, the motors 12a and 12b rotate the respective rolls 1 and 2 such that in a case where the hollow fiber membranes Ha, Hb, and Hc are wound so as to span across the rolls 1 and 2, the hollow fiber membranes Ha, Hb, and Hc on the upper sides of the rolls move in a direction from the first roll 1 to the second roll 2 and the hollow fiber membranes Ha, Hb, and Hc on the lower sides of the rolls move in a direction from the second roll 2 to the first roll 1. Then, the respective motors 12a and 12b are driven in synchronization with each other.

On the front side (the lower side in FIGS. 22 and 23) of the first roll 1 configured in this manner, three bobbins 5a, 5b, and 5c are disposed. More specifically, the three bobbins 5a, 5b, and 5c are disposed so as to follow a winding direction and be in a state where the bobbins 5a, 5b, and 5c are gradually slightly shifted toward the other end 1b and other end 2b sides (the upper side in FIG. 23) of the respective rolls 1 and 2 from one end 1a and one end 2a sides (the lower side in FIG. 23) of the respective rolls 1 and 2 with increasing distance from the first roll 1. Then, the respective bobbins 5a, 5b, and 5c are rotatably supported on the respective bobbin unwinding devices 51a, 51b, and 51c and are in a state of being fixed so as to be immovable in the width direction.

Further, the hollow fiber membranes Ha, Hb, and Hc in an amount sufficient to produce the hollow fiber membrane sheet-like object S having a predetermined area are respectively wound on the bobbins 5a, 5b, and 5c, and it is possible to continuously supply the hollow fiber membranes Ha, Hb, and Hc. The three hollow fiber membranes Ha, Hb, and Hc are respectively transported so as to be drawn along the winding direction toward the respective rolls 1 and 2 from the respective bobbins 5a, 5b, and 5c provided in this manner, thereby being supplied to the respective rolls 1 and 2.

Here, the three hollow fiber membranes Ha, Hb, and Hc are supplied to the grooves of the roll 1 in a state of being disposed in parallel in the width direction (the details will be described later). For this reason, it is preferable that the amounts of shift of the respective bobbins 5a, 5b, and 5c and guide rolls 6a, 6b, and 6c be set to be approximately the same shift amounts as the groove pitches of the rolls 1 and 2.

The guide rolls 6a, 6b, and 6c are respectively provided in transport pathways of the respective hollow fiber membranes Ha, Hb, and Hc between the respective bobbins 5a, 5b, and 5c and the first roll 1. The respective guide rolls 6a, 6b, and 6c are for supplying the hollow fiber membranes Ha, Hb, and Hc to the appropriate positions of the respective rolls 1 and 2 and are rotatably supported on a roll stand (not shown). It is preferable that the respective guide rolls 6a, 6b, and 6c rotate at a peripheral speed equivalent to transport speeds of the hollow fiber membranes Ha, Hb, and Hc.

In addition, a material of each of the guide rolls 6a, 6b, and 6c is not particularly limited. However, it is preferable to select a material in which static electricity is not easily generated in the hollow fiber membrane H. Further, if tension is appropriately given to the hollow fiber membranes Ha, Hb, and Hc by the bobbins 5a, 5b, and 5c and movement in a direction along the central axes of the bobbins 5a, 5b, and 5c, of the hollow fiber membranes Ha, Hb, and Hc which are supplied from the bobbins 5a, 5b, and 5c, can be ignored, the respective guide rolls 6a, 6b, and 6c may be omitted.

Here, if excessive tension is given, since the hollow fiber membranes Ha, Hb, and Hc extend, thereby causing cutting in some cases, it is preferable that the tension be as small as possible in the range that there is no transfer of the hollow fiber membranes Ha, Hb, and Hc to neighboring grooves due to flopping of the hollow fiber membranes Ha, Hb, and Hc in a process, and in addition, it is preferable that the tension be appropriately adjusted according to the amounts of winding of the hollow fiber membranes Ha, Hb, and Hc wound around the bobbins 5a, 5b, and 5c or the diameters or the film thicknesses of the hollow fiber membranes Ha, Hb, and Hc.

As means for controlling tension, for example, a method to apply moderate braking to rotating shafts (without driving) to which the bobbins 5a, 5b, and 5c are fixed, or a method to install dancer rolls (not shown) between the respective bobbins 5a, 5b, and 5c (with driving) and the respective guide rolls 6a, 6b, and 6c can be given. However, there is no limitation thereto.

Further, the first ultrasonic welding machine 4 is provided on the upper side opposite to the base 10 between the first roll 1 and the second roll 2. The first ultrasonic welding machine 4 is for forming a connection section C1 by welding and fixing the vicinity of leading end portions Ha1, Hb1, and Hc1 of the hollow fiber membranes Ha, Hb, and Hc to the hollow fiber membranes Ha, Hb, and Hc subsequently wound around the rolls 1 and 2, in a state where the hollow fiber membranes Ha, Hb, and Hc which are sent out from the respective bobbins 5a, 5b, and 5c are wound around the outer peripheral portions of the rolls 1 and 2 so as to surround the rolls 1 and 2 and so as not to overlap (refer to FIGS. 24 and 25, the details will be described later).

In addition, the second ultrasonic welding machine 9 is provided between the first roll 1 and the second roll 2. The second ultrasonic welding machine 9 has a function to fix the hollow fiber membranes Ha, Hb, and Hc into the form of a sheet over the width directions of the respective rolls 1 and 2 (a direction perpendicular to the longitudinal directions of the hollow fiber membranes Ha, Hb, and Hc) (refer to FIGS. 22, 24 and 25, the details will be described later). The second ultrasonic welding machine 9 includes the anvil 8 and the horn 7 disposed above the anvil 8.

Further, the second ultrasonic welding machine 9 is configured so as to be movable in the winding direction by a driving device (not shown). In this way, even if the hollow fiber membranes Ha, Hb, and Hc are in a stopped state, it becomes possible to weld different places. In this embodiment, two fixed sections B (refer to FIG. 29) are formed at a predetermined interval in the transport directions of the hollow fiber membranes Ha, Hb, and Hc. In addition, at the welded place, the shapes (the hollow shaped) of the hollow fiber membranes Ha, Hb, and Hc need not be maintained.

In addition, the ultrasonic cutter 11 is provided on the upper side opposite to the base 10 between the first roll 1 and the second roll 2. The ultrasonic cutter 11 is for cutting in the width direction an area between the two fixed sections B formed at a predetermined interval in the transport directions of the hollow fiber membranes Ha, Hb, and Hc by the second ultrasonic welding machine 9.

Figure 24:
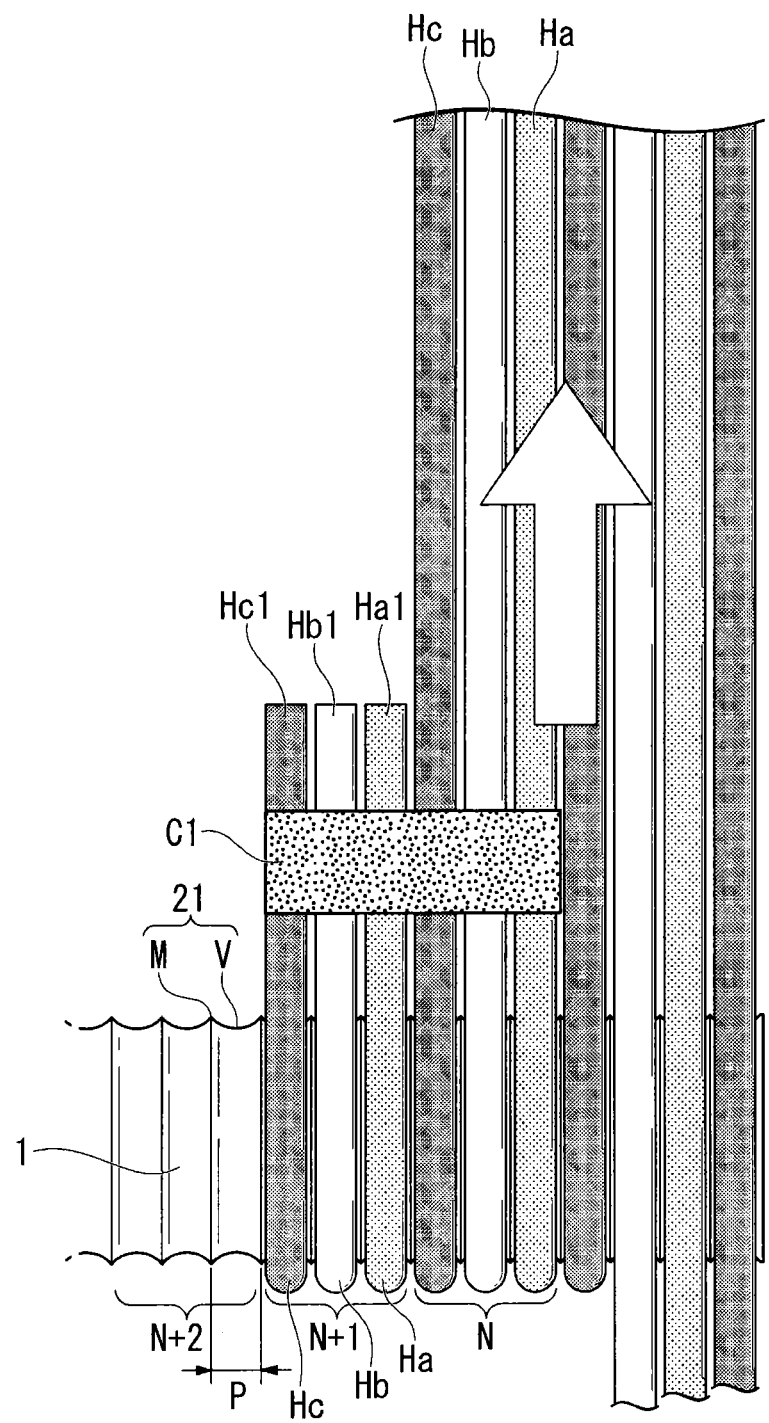
FIG. 24 is a plan view showing a state where a hollow fiber membrane is wound around a first roll 1 in the third embodiment of the invention.
Figure 25:
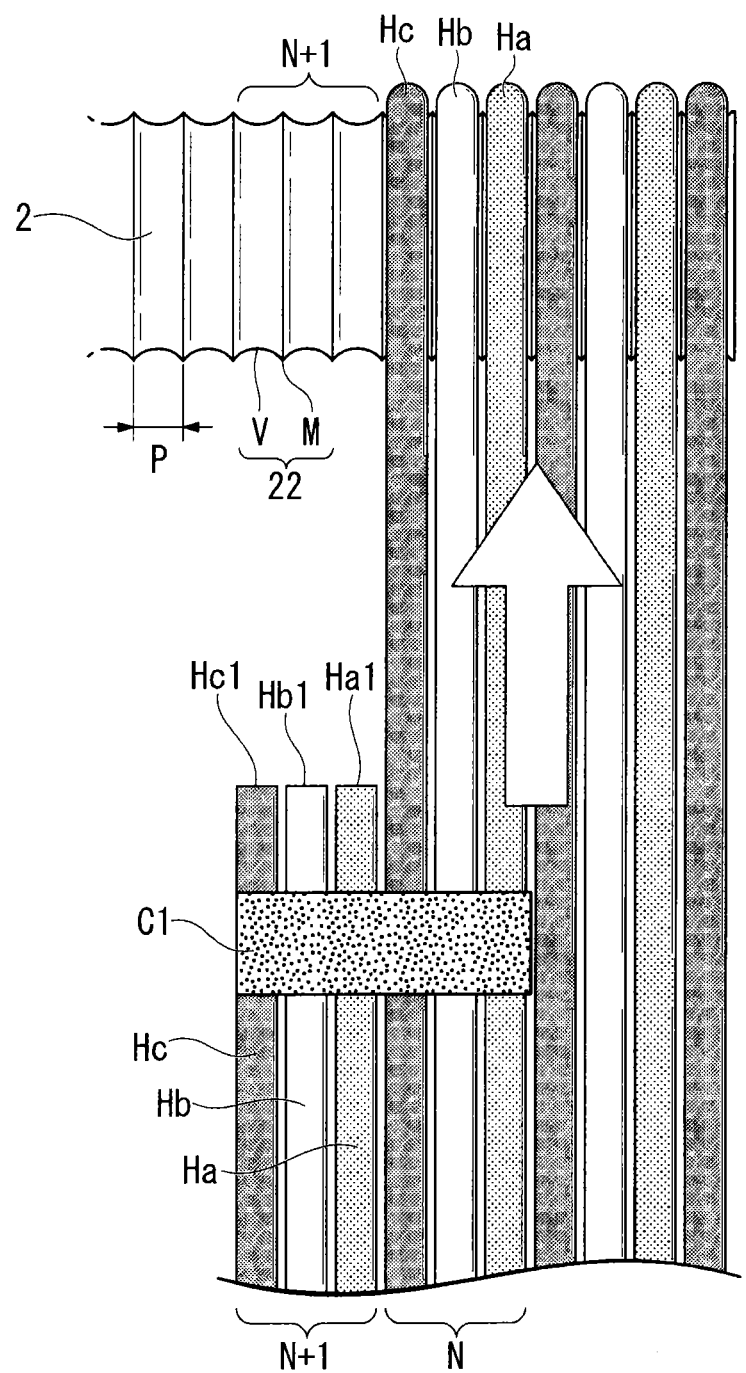
FIG. 25 is a plan view showing a state where the hollow fiber membrane is wound around a second roll 2 in the third embodiment of the invention.

FIG. 24 is a plan view showing a state where the hollow fiber membranes Ha, Hb, and Hc are wound around the first roll 1 and FIG. 25 is a plan view showing a state where the hollow fiber membranes Ha, Hb, and Hc are wound around the second roll 2.

As shown in FIGS. 24 and 25, the respective rolls 1 and 2 have two or more circumferential grooves 21 and 22 which are configured by the mountain portions M and the valley portions V densely formed in a parallel fashion at the same pitch P, and arranged in the width direction. The grooves 21 and 22 are formed independently of each other, rather than being spirally formed. Then, the valley portion V is formed so as to have an approximately arc-shaped cross-section. By forming the valley portion V so as to have an approximately arc-shaped cross-section in this manner, it becomes possible to increase close contact between the hollow fiber membranes Ha, Hb, and Hc and the grooves 21 and 22.

The pitches P of the grooves 21 and 22 are determined depending on the diameters of the hollow fiber membranes Ha, Hb, and Hc and desired integration density of the hollow fiber membranes in a desired hollow fiber membrane sheet-like object S. However, if in a case where the diameters of the hollow fiber membranes Ha, Hb, and Hc are the same, the pitch P is set to be wide by a round (1% to 3%) or more with respect to the diameter of each of the hollow fiber membranes Ha, Hb, and Hc and in a case where the diameters of the hollow fiber membranes Ha, Hb, and Hc are different from each other, the pitch P is set to be wide by 1% to 3% or more with respect to the diameter of the hollow fiber membrane having a smaller diameter, of two adjacent hollow fiber membranes, it is preferable in that deterioration in quality, a shift, entanglement, or the like due to contact between the hollow fiber membranes which are adjacently transported is also not easily generated in a production process which will be described later.

In addition, the shape of each of the grooves 21 and 22 is not limited to a shape in which the valley portion V is formed so as to have an approximately arc-shaped cross-section and may be, for example, a shape in which the mountain portion M and the valley portion V are linearly connected and may also be a shape in which a groove bottom is flat.

Next, a method for producing the hollow fiber membrane sheet-like object S using the production device 100C will be described.

Figure 26:
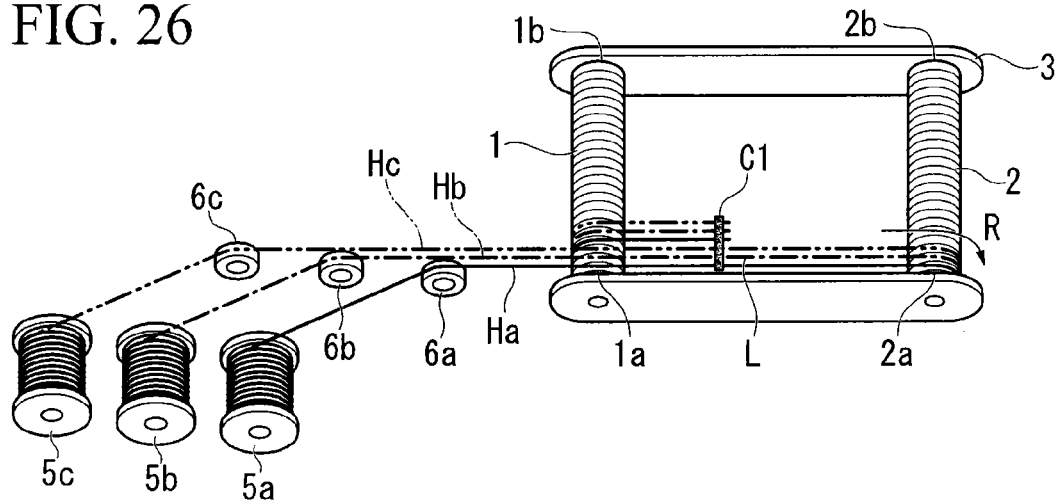
FIG. 26 is an explanatory diagram showing a process of producing a hollow fiber membrane sheet-like object according to the third embodiment of the invention.
Figure 27:
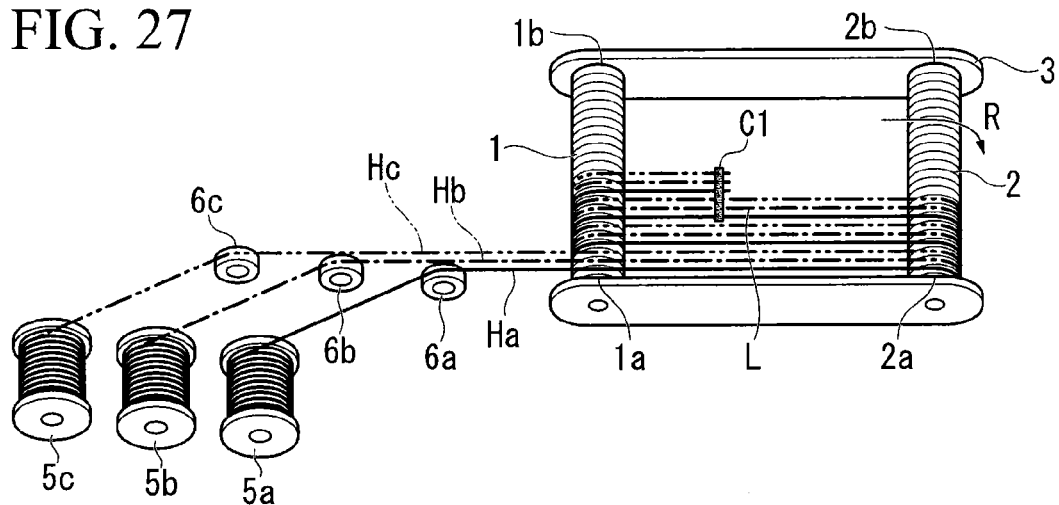
FIG. 27 is an explanatory diagram showing the process of producing a hollow fiber membrane sheet-like object according to the third embodiment of the invention.
Figure 28:
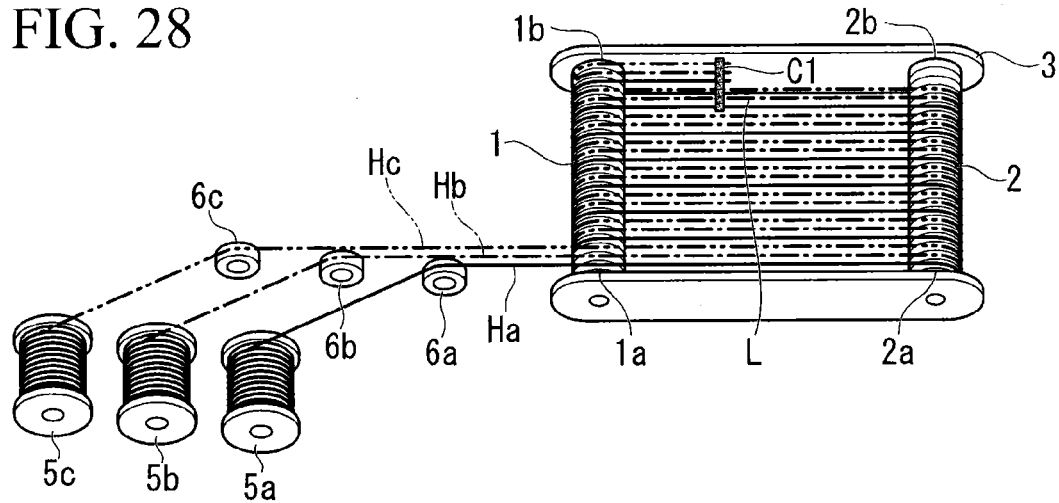
FIG. 28 is an explanatory diagram showing the process of producing a hollow fiber membrane sheet-like object according to the third embodiment of the invention.

FIGS. 26 to 28 are explanatory diagrams showing a process of producing the hollow fiber membrane sheet-like object S.

First, as shown in FIGS. 24 to 28, the three hollow fiber membranes Ha, Hb, and Hc are respectively drawn out from the three bobbins 5a, 5b, and 5c and supplied to one-end sides (the right side in FIGS. 24 and 25, the lower side in FIG. 26) of the respective rolls 1 and 2 in a state where the hollow fiber membranes Ha, Hb, and Hc are disposed in parallel in the width direction. Then, the hollow fiber membranes Ha, Hb, and Hc are wound by one round so as to surround the respective rolls 1 and 2, while still in a state of being disposed in parallel.

Subsequently, the leading end portions Ha1, Hb1, and Hc1 of the hollow fiber membranes Ha, Hb, and Hc are shifted further to the other end side (the left side in FIGS. 24 and 25, the upper side in FIG. 26) than the hollow fiber membranes Ha, Hb, and Hc subsequently wound around the rolls 1 and 2 such that the leading end portions Ha1, Hb1, and Hc1 do not overlap the hollow fiber membranes Ha, Hb, and Hc subsequently wound around the rolls 1 and 2. In this state, the vicinity of the leading end portions Ha1, Hb1, and Hc1 of the hollow fiber membranes Ha, Hb, and Hc and the hollow fiber membranes Ha, Hb, and Hc subsequently wound around the rolls 1 and 2 are welded and fixed to each other by using the first ultrasonic welding machine 4 shown in FIG. 22 (a connecting process).

In this way, the connection section C1 is formed in the hollow fiber membranes Ha, Hb, and Hc and the hollow fiber membrane loop L is formed.

When fixing end portions of the hollow fiber membranes Ha, Hb, and Hc, fixing is performed such that moderate tension is given to the hollow fiber membrane loop L. It is preferable that the tension be as small as possible in the range that there is no transfer of the hollow fiber membrane loop L to a neighboring groove due to flopping hollow fiber membrane loop L in a production process, and it is preferable that the tension be appropriately adjusted according to the diameter or the film thickness of the hollow fiber membrane H. Further, the hollow fiber membrane loop L is wound in the grooves closest to one end 1a and one end 2a of the respective rolls 1 and 2.

Next, the motors 12a and 12b are driven, whereby the first roll 1 and the second roll 2 are rotated, thereby starting winding of the hollow fiber membranes Ha, Hb, and Hc. Then, the hollow fiber membranes Ha, Hb, and Hc rotate in a direction of an arrow shown by sign R in FIG. 5.

At this time, as shown in FIGS. 24 and 25, the leading end portions Ha1, Hb1, and Hc1 of the hollow fiber membranes Ha, Hb, and Hc are led to N+1-th stage grooves 21 and 22 while being accompanied by the just before (N-th) hollow fiber membrane H which is fitted in three N-th stage grooves 21 and 22 each shown by sign N and self-propels. Also in rotation to the back side, similarly, the leading end portions Ha1, Hb1, and Hc1 of the hollow fiber membranes Ha, Hb, and Hc are led to three N+2-th stage grooves 21 and 22 while being accompanied by the just before (N+1-th) hollow fiber membranes Ha, Hb, and Hc fitted in the three N+1-th stage grooves 21 and 22.

Continuously, the respective rolls 1 and 2 continue to rotate, whereby the leading end portions Ha1, Hb1, and Hc1 and the hollow fiber membrane loop L move, and thus the hollow fiber membranes Ha, Hb, and Hc which is drawn out from the respective bobbins 5a, 5b, and 5c are wound around the rolls 1 and 2 (a winding process).

In addition, as shown in FIG. 27, also in a case where the hollow fiber membrane loop L moves to the other end 1b and other end 2b sides of the respective rolls 1 and 2, the positions where the hollow fiber membranes Ha, Hb, and Hc are supplied from the bobbins 5 do not change. That is, it is not necessary to move supply positions of the hollow fiber membranes Ha, Hb, and Hc to the roll 1.

As shown in FIG. 28, winding is completed at a stage in which the hollow fiber membrane loop L reaches the groove formed on most the other end side, or at a stage in which the width of the sheet-shaped hollow fiber membranes Ha, Hb, and Hc reaches the width or the number of yarns of a desired hollow fiber membrane sheet-like object S. As shown in FIGS. 24 and 25, the grooves 21 and 22 formed at the same pitch P are formed in the first roll 1 and the second roll 2, whereby yarn pitches of the hollow fiber membranes Ha, Hb, and Hc constituting the hollow fiber membrane sheet-like object S can be more evenly aligned.

Figure 29:
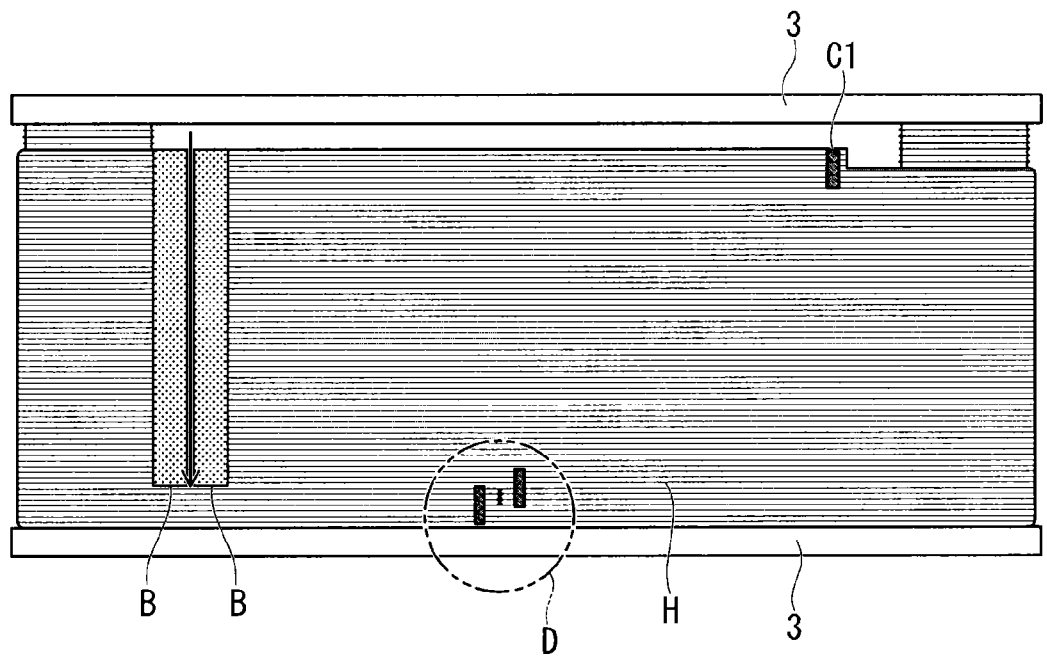
FIG. 29 is an explanatory diagram showing a method of fixing a hollow fiber membrane sheet-like object in the third embodiment of the invention.
Figure 30:
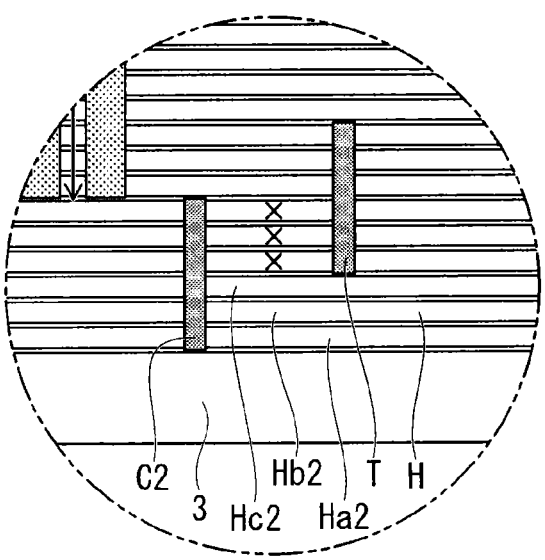
FIG. 30 is an enlarged view of portion D of FIG. 29.

Next, a process of fixing the hollow fiber membrane sheet-like object S after completion of winding of the hollow fiber membranes Ha, Hb, and Hc will be described. FIG. 29 is an explanatory diagram showing a method of fixing the hollow fiber membrane sheet-like object S and FIG. 30 is an enlarged view of portion D in FIG. 29. As shown in FIG. 30, after completion of the winding, the hollow fiber membranes Ha, Hb, and Hc which are located on the one most end 1a and one most end 2a sides, among the wound hollow fiber membranes Ha, Hb, and Hc, are welded and fixed to each other by using the first ultrasonic welding machine 4 shown in FIG. 22, whereby the connection section C2 is formed (a fixing process). Here, a leading end of the next hollow fiber membrane sheet-like object S (the second hollow fiber membrane sheet-like object), which is obtained by forming the connection section C2 is set to be leading end portions Ha2, Hb2, and Hc2.

Subsequently, a terminus section shown by sign T, in the hollow fiber membranes Ha, Hb, and Hc constituting the hollow fiber membrane sheet-like object S which is taken out, is fixed, and an area between the connection section C2 and the terminus section T is cut.

Next, the hollow fiber membranes Ha, Hb, and Hc are welded to each other at two places, as shown in FIG. 29, by using the second ultrasonic welding machine 9 shown in FIG. 22, whereby fixed sections B are formed. At this time, it is preferable to weld a place except for the hollow fiber membranes Ha, Hb, and Hc constituting the second hollow fiber membrane sheet-like object.

After the welding, the ultrasonic cutter 11 shown in FIG. 22 is moved in the width direction, thereby cutting an area between the two fixed sections B, that is, a place except for the hollow fiber membranes Ha, Hb, and Hc constituting the second hollow fiber membrane sheet-like object, and the hollow fiber membranes Ha, Hb, and Hc are removed from the respective rolls 1 and 2 (a cutting process). Then, as shown in FIG. 10, the hollow fiber membrane sheet-like object S is obtained.

The hollow fiber membrane sheet-like object S is taken out from the state of FIG. 29, whereby return to the same state as in FIGS. 24 and 25 is performed, and continuously, production of the hollow fiber membrane sheet-like object S becomes possible.

Therefore, according to the embodiment described above, a configuration in which the hollow fiber membranes Ha, Hb, and Hc are wound so as to span across the respective rolls 1 and 2 is provided, and the respective rolls 1 and 2 are rotatably supported on the frame 3. For this reason, the first ultrasonic welding machine 4 or the second ultrasonic welding machine 9 can be disposed between the respective rolls 1 and 2. In other words, a receiving jig (an anvil) for fixing the first ultrasonic welding machine 4 or the second ultrasonic welding machine 9 can be disposed between the respective rolls 1 and 2. Accordingly, fixing of the hollow fiber membranes Ha, Hb, and Hc can be realized more reliably and by a simpler configuration.

Further, when changing the length of the hollow fiber membrane sheet-like object S which is produced, it becomes possible to easily change the length of the hollow fiber membrane sheet-like object S, for example, by a configuration capable of adjusting the length of the frame 3 without changing the respective rolls 1 and 2 is taken.

In addition, the hollow fiber membrane loop L self-propels on the rolls 1 and 2 in which the grooves 21 and 22 formed at the same pitch P are formed, whereby the hollow fiber membranes Ha, Hb, and Hc are wound around the respective rolls 1 and 2 while the leading end portions Ha1, Hb1, and Hc1 of the hollow fiber membranes Ha, Hb, and Hc are transferred from the grooves 21 and 22 on one-end sides of the respective rolls 1 and 2 to the grooves 21 and 22 on the other end sides. For this reason, it is possible to obtain the high-quality hollow fiber membrane sheet-like objects S in which the hollow fiber membrane are disposed in parallel in a row at a predetermined pitch P, without providing traversing mechanisms in the guide rolls 6*a*, 6*b*, and 6*c*. Further, if appropriate tension can be given to the hollow fiber membranes Ha, Hb, and Hc and changes in the yarn feeding angles of the hollow fiber membranes Ha, Hb, and Hc which are supplied from the bobbins 5*a*, 5*b*, and 5*c* can be ignored, the guide rolls 6*a*, 6*b*, and 6*c* themselves may become unnecessary.

Then, since the hollow fiber membranes Ha, Hb, and Hc are respectively drawn out from the respective bobbins 5*a*, 5*b*, and 5*c* and the hollow fiber membranes Ha, Hb, and Hc are supplied to the respective rolls 1 and 2 at a time, the time to be taken while the hollow fiber membrane sheet-like object S is obtained can be shortened, compared to a case of supplying a single hollow fiber membrane to the respective rolls 1 and 2.

Further, since the hollow fiber membranes Ha, Hb, and Hc are supplied to the respective rolls 1 and 2 in a state of being disposed in parallel in the width direction, twist of the hollow fiber membranes Ha, Hb, and Hc during winding can be prevented. That is, in a case of winding a single hollow fiber membrane, the hollow fiber membrane is easily twisted with a core of the hollow fiber membrane as the center. However, the three hollow fiber membranes Ha, Hb, and Hc are disposed in parallel, whereby the width of the hollow fiber membranes as a whole increases, and thus it becomes difficult for the hollow fiber membranes Ha, Hb, and Hc to be twisted. For this reason, the high-quality hollow fiber membrane sheet-like object S can be provided.

In addition, since the ultrasonic cutter 11 is provided in the production device 100C, it is possible to automate a process of cutting the fixed section B in the hollow fiber membranes Ha, Hb, and Hc, thereby cutting out the hollow fiber membranes Ha, Hb, and Hc and obtaining the hollow fiber membrane sheet-like object S. For this reason, productivity can be further improved.

In addition, the invention is not limited to the above-described embodiment and also includes configurations in which various changes are added to the above-described embodiment within a scope which does not depart from the gist of the invention.

For example, in the above-described embodiment, a case has been described where the motor 12*a* and 12*b* are respectively mounted on the first roll 1 and the second roll 2 and the respective motor 12*a* and 12*b* are driven in synchronization with each other. However, there is no limitation thereto and a configuration is also possible in which a motor is mounted on any one of the first roll 1 and the second roll 2 and the hollow fiber membranes Ha, Hb, and Hc are wound around the respective rolls 1 and 2 by rotating only any one of the first roll 1 and the second roll 2.

Further, in the above-described embodiment, the production device 100C has a configuration in which two rolls 1 and 2, that is, the first roll 1 and the second roll 2 are provided and the hollow fiber membranes Ha, Hb, and Hc are wound so as to surround the rolls 1 and 2. However, there is no limitation thereto, and it is enough if at least two rolls are provided, and three or more rolls may also be provided.

In addition, in the above-described embodiment, a case has been described where the first ultrasonic welding machine 4 is used in forming the connection sections C1 and C2 in the hollow fiber membranes Ha, Hb, and Hc, and the second ultrasonic welding machine 9 is used in forming the fixed sections B. However, there is no limitation thereto, and for example, fixing by thermal fusion bonding, a tape, or an adhesive, specifically, fixing by a thermal welding machine such as an impulse heater, a tape feeder, an adhesive coater, or a jig, or the like is also acceptable.

Then, in the above-described embodiment, a case has been described where in the sheet fixing process, the terminus section T and the connection section C2 are provided at independent positions with respect to the fixed section B. However, there is no limitation thereto and a configuration may also be made as follows.

Figure 31:
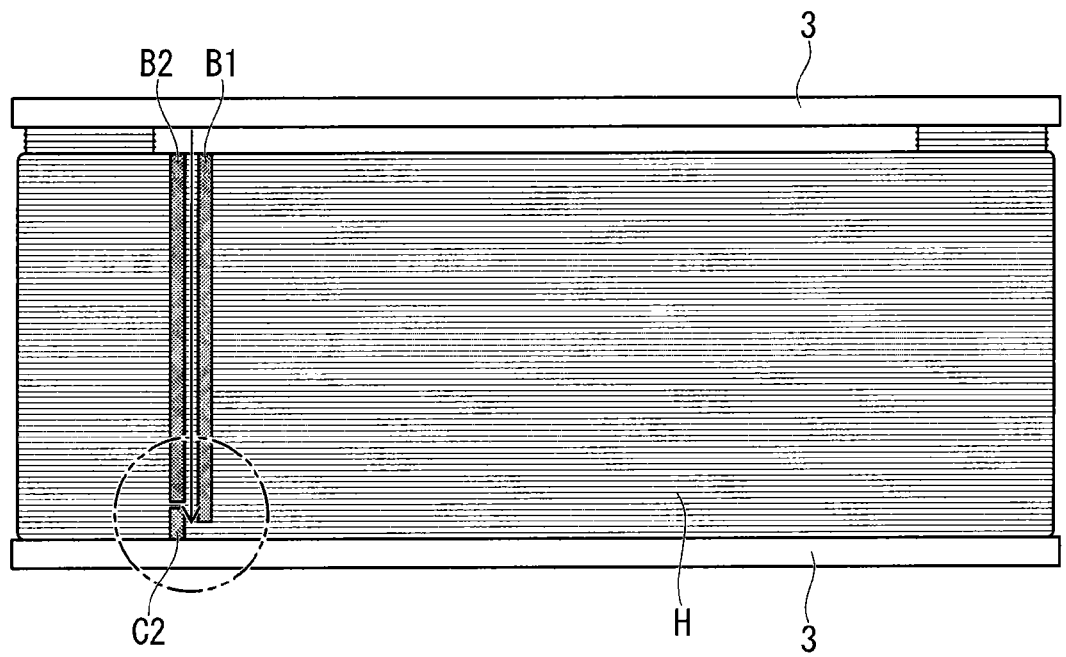
FIG. 31 is a diagram showing the production process according to the third embodiment of the invention and a diagram describing another method of fixing the hollow fiber membrane sheet-like object.
Figure 32:
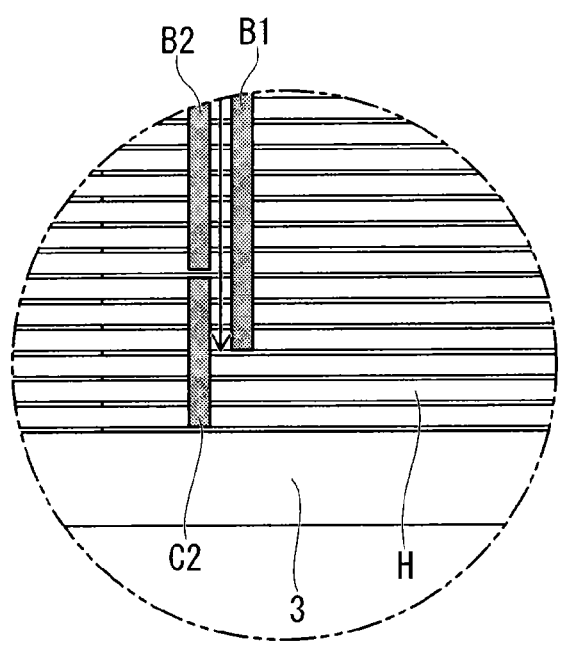
FIG. 32 is an enlarged view of a portion of FIG. 31.

FIG. 31 is an explanatory diagram showing a production process and an explanatory diagram describing another method of fixing the hollow fiber membrane sheet-like object S, and FIG. 32 is an enlarged view of a portion of FIG. 31.

That is, the sheet fixing process can be simplified by performing welding at positions as shown by signs B1, B2, and C2 in FIGS. 31 and 32.

More specifically, as shown in FIGS. 31 and 32, a fixed section shown by sign B1 fixes an end portion of the hollow fiber membrane sheet-like object S and also fixes a terminus section (equivalent to the terminus section T in FIG. 30) of the hollow fiber membrane H. Further, a fixed section shown by sign B2 and a connection section shown by sign C2 are disposed on the same line. Since the welding process can be simplified by disposing the fixed sections B1 and B2 in this manner, the time it takes to perform a process of fixing the hollow fiber membrane sheet-like object S can be shortened.

Further, a method is also acceptable in which the fixed section B is set to be one place and the hollow fiber membrane sheet-like object S is obtained by cutting out an approximately central portion of the fixed section B. In this way, it is possible to obtain the hollow fiber membrane sheet-like object S in which the fixed sections B are provided at both end portions of the hollow fiber membrane sheet-like object S.

In addition, in the above-described embodiment, a case has been described where the ultrasonic cutter 11 is provided between the first roll 1 and the second roll 2 and the ultrasonic cutter 11 is moved in the width direction, thereby cutting the hollow fiber membranes Ha, Hb, and Hc. However, as means for cutting the hollow fiber membranes Ha, Hb, and Hc, there is no limitation to a case of using the ultrasonic cutter 11 and it is also possible to use means such as an edged tool, scissors, a rotating blade, a heater wire, or a laser cutter. Further, a cutting line formed by cutting need not be a straight line.

Figure 33:
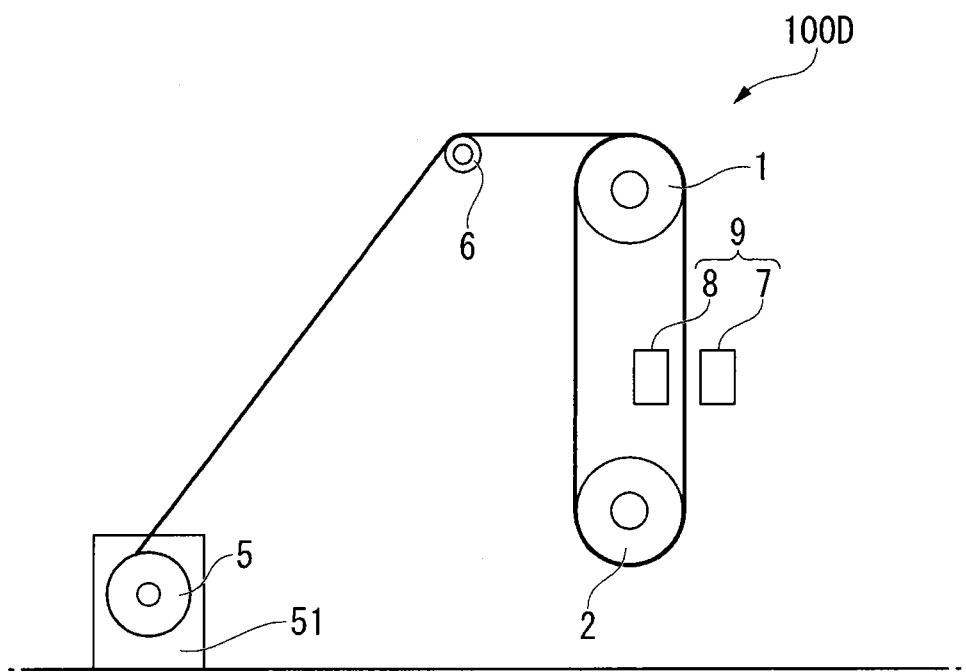
FIG. 33 is a schematic side view of a device for producing a hollow fiber membrane sheet-like object according to a fourth embodiment of the invention.
Figure 34:
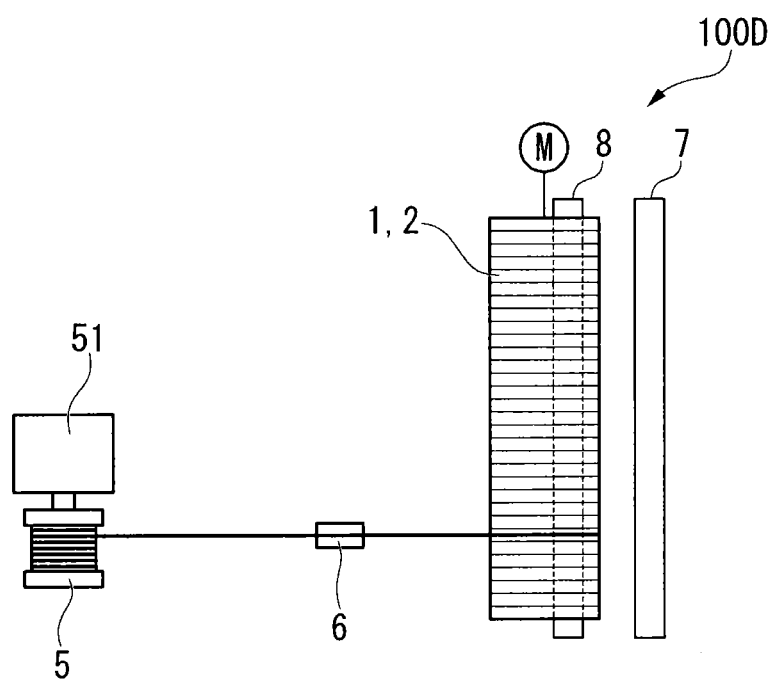
FIG. 34 is a schematic plan view of the device for producing a hollow fiber membrane sheet-like object according to the fourth embodiment of the invention.

Next, a fourth embodiment of the device for producing a hollow fiber membrane sheet-like object according to the invention will be described. FIG. 33 is a schematic side view of a device 100 D for producing the hollow fiber membrane sheet-like object S, in which the rolls 1 and 2 are disposed in a vertical direction, and FIG. 34 is a schematic plan view thereof. Since slack of a yarn due to the force of gravity can be suppressed during winding by disposing the rolls 1 and 2 in a vertical plane, as in the drawings, it is possible to reduce unevenness of the length of the yarn. In the drawings, a case of supplying a single hollow fiber membrane is illustrated. However, a plurality of hollow fiber membranes may be supplied still in a juxtaposition state, as in the third embodiment.

Figure 35:
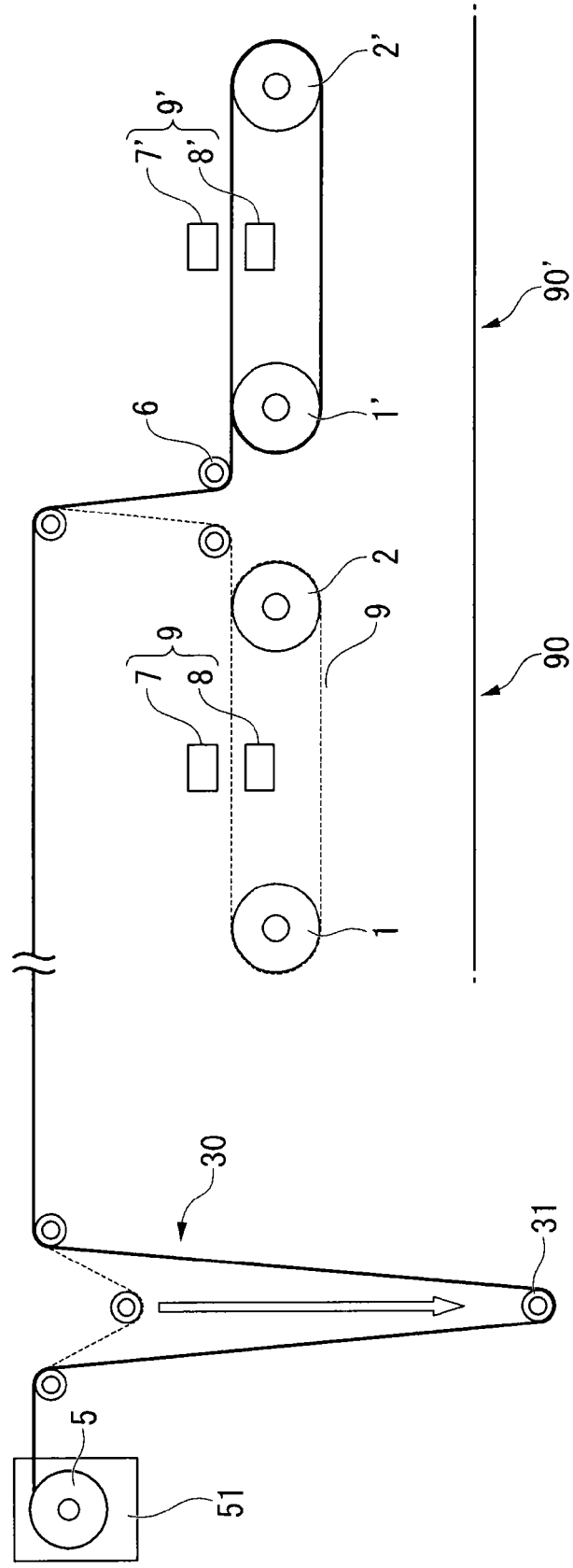
FIG. 35 is a schematic side view of a device for producing a hollow fiber membrane sheet-like object according to a fifth embodiment of the invention.

Next, a fifth embodiment of the device for producing a hollow fiber membrane sheet-like object according to the invention will be described. FIG. 35 is a schematic side view of a device for producing the hollow fiber membrane sheet-like object S, in which two units each having two or more rolls are disposed. In this embodiment, it is possible to take a continuous production form by arranging the two units each having two or more rolls so as to face each other and alternately supplying a hollow fiber membrane which is supplied at a constant speed. In this embodiment, units 90 and 90' each having the two or more rolls and the second ultrasonic welding machine are arranged so as to face each other and an accumulation mechanism 30 is disposed at the preceding stage thereof. A hollow fiber membrane is wound by driving at least one roll of the unit 90 at the same winding speed as a supply speed of the hollow fiber membrane. Gradual deceleration is started from before a predetermined amount of winding is obtained, and when the predetermined amount of winding has been obtained, the winding speed of the unit 90 is made to become zero. The supply speed of the hollow fiber membrane in the preceding stage of the accumulation mechanism 30 is not changed, and an accumulation roll 31 descends in conjunction with movement of the roll such that slack and tension of a yarn do not appear at a subsequent stage. While a feed speed of the hollow fiber membrane after the accumulation mechanism 30 becomes zero, the hollow fiber membrane supplied to the unit 90 is cut, and after the hollow fiber membrane is set on another unit 90', gradual acceleration of a roll 1' and/or a roll 2' is started. Until the accumulation roll 31 ascends to a predetermined position, the winding speed of the roll is made larger than the supply speed of the hollow fiber membrane in the preceding stage of the accumulation device, and if the accumulation roll 31 returns to a predetermined position, the winding speed is adjusted so as to become the same speed as the supply speed of the hollow fiber membrane. A sheet wound at the unit 90 is collected after the fixing process and the cutting process while winding is performed at the unit 90'. Due to the form capable of performing continuous production in this manner, it becomes possible to dispose the production device according to the invention at a subsequent stage of membrane production equipment and it is possible to save the effort of winding on a bobbin first. In the drawing, a case of supply a single hollow fiber membrane is illustrated. However, as in the second embodiment, a plurality of hollow fiber membranes may be supplied still in a juxtaposition state.

Figure 36:
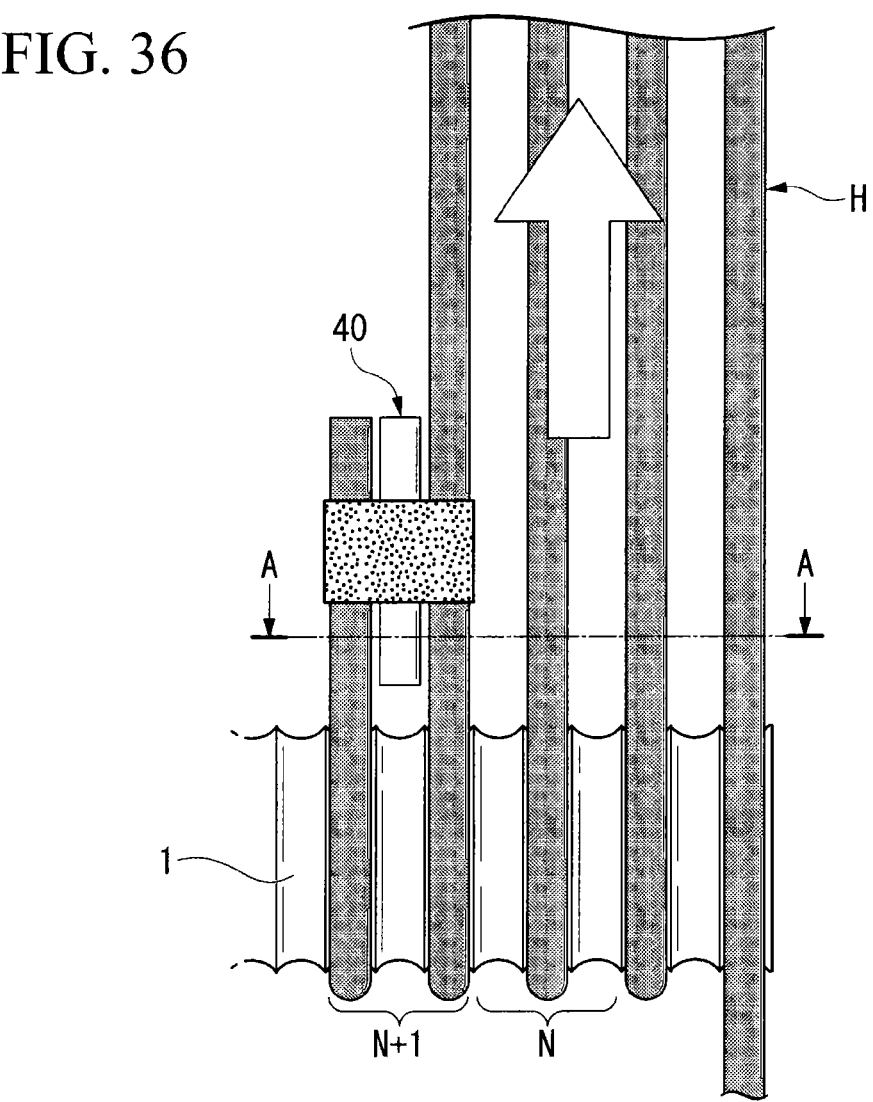
FIG. 36 is a plan view showing a state where a hollow fiber membrane is wound around the first roll 1 in a case where a pitch is increased.
Figure 37:
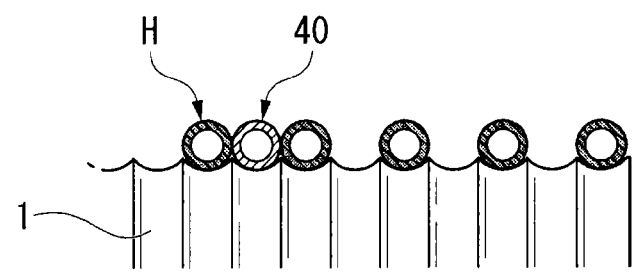
FIG. 37 is a cross-sectional view along the line A-A of FIG. 36.

Next, the device for producing a hollow fiber membrane sheet-like object according to the invention can also perform winding at an increased pitch. FIG. 36 is a plan view showing a state where a hollow fiber membrane is wound around the first roll 1 in a case where a pitch is increased. FIG. 37 is a cross-sectional view along the line A-A of FIG. 36. In a case where a large pitch is taken, the gap between adjacent hollow fiber membranes becomes large, and thus a force to fix the hollow fiber membranes to each other is prone to become weak. Therefore, the hollow fiber membranes are fixed to each other by forming a connection section with a spacer 40 interposed between the hollow fiber membranes. In this way, even in a case where a large pitch is taken, it is possible to stably fix the hollow fiber membranes to each other. Further, it is preferable to take a form in which the space is also fitted in the groove of the roll such that there is no case where the spacer is placed on the mountain portion of the groove, whereby a leading end portion of the hollow fiber membrane deviates from a guide. In this way, it becomes also possible to take a large yarn pitch. In addition, in the drawings, a case is illustrated where the spacer corresponding to one groove is interposed and a pitch corresponding to one groove is taken. However, a plurality of spacers may be interposed in parallel and a case where a pitch corresponds to two or more grooves is also acceptable.

Figure 38:
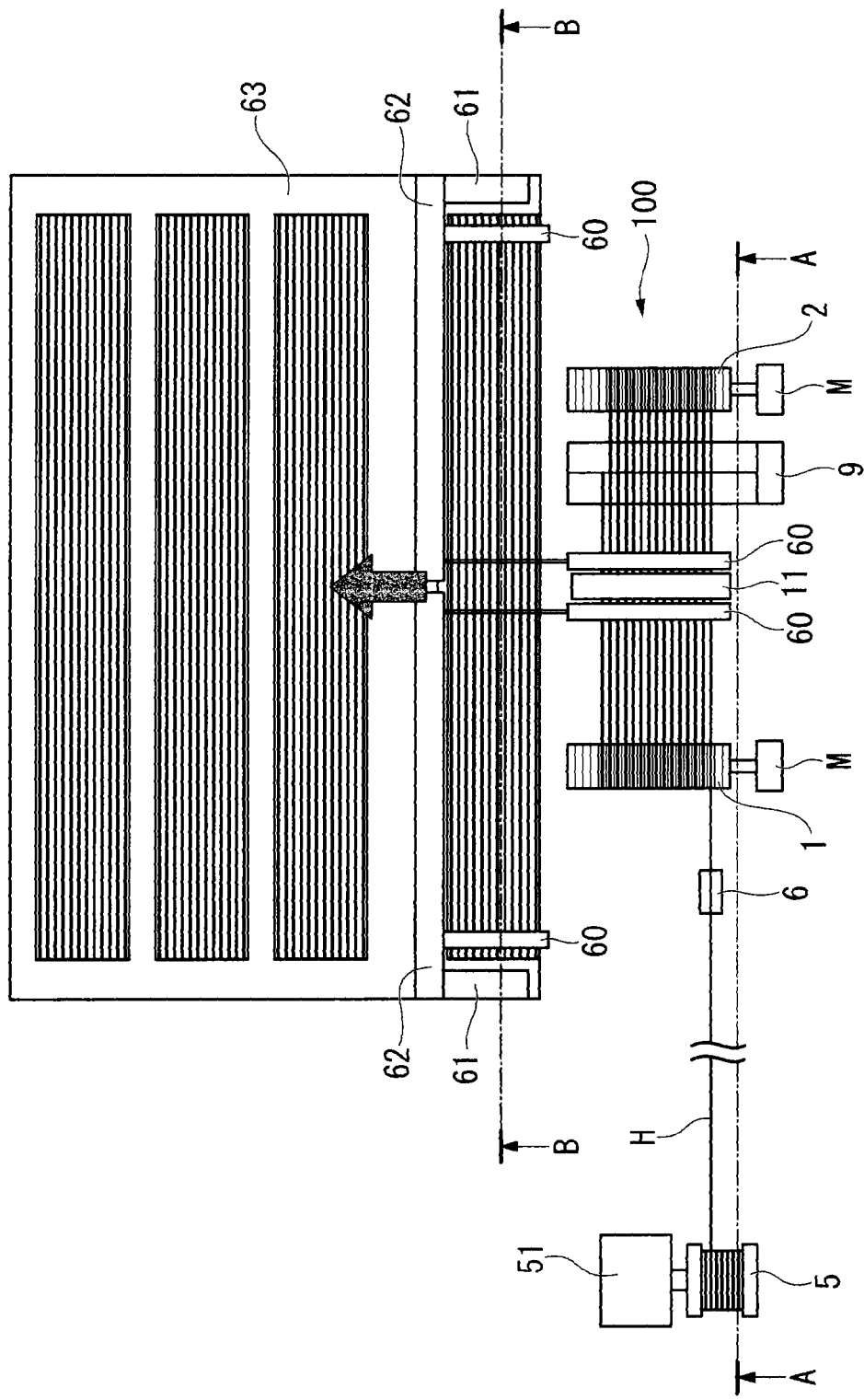
FIG. 38 is a schematic plan view of an automated process.
Figure 39:
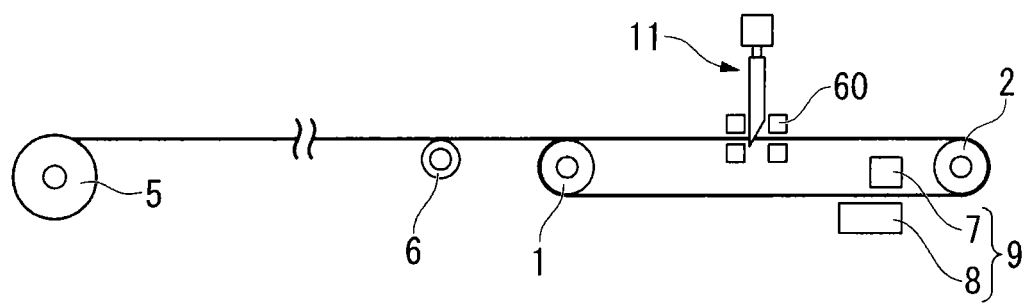
FIG. 39 is a cross-sectional view along the line A-A of FIG. 38.
Figure 40:
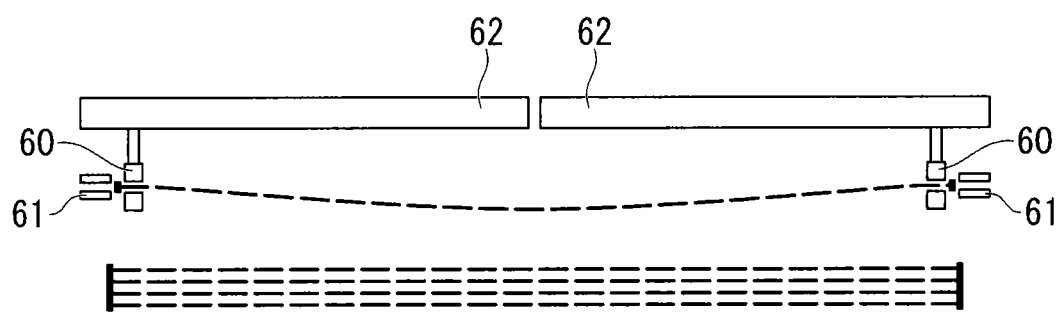
FIG. 40 is a cross-section along the line B-B of FIG. 38.

The device for producing a hollow fiber membrane sheet-like object according to the invention can be used in an automated process. FIG. 38 is a schematic plan view of an automated process, FIG. 39 is a cross-sectional view along the line A-A of FIG. 38, and FIG. 40 is a cross-section along the line B-B of FIG. 38.

In the device for producing a hollow fiber membrane sheet-like object 100 according to the invention, after the hollow fiber membrane is wound and welded (fixed) at two places, normal rotation of the roll is performed such that the welding places are on the top. A hand 60 having a length in which a sheet can be gripped is inserted, thereby gripping a wound sheet. Here, the hand 60 and a thin hand 61 are fixed to a linear guide 62 and made to be movable in the winding direction and the width direction. In this way, the sheet can be moved from the production device to a belt conveyor. Thereafter, the distance between the rolls is reduced to the extent that tension can be relaxed. Next, an area between two welded places (fixed sections) is cut by the ultrasonic cutter 11. After the cutting, the distance between the rolls is returned to the original distance, and thus the cut sheet is spread in a longitudinal direction, and the sheet is taken out from the production device while being gripped by the hand 60. The thin hand 61 is inserted from the longitudinal direction of the sheet, thereby gripping the welded places, and substitutes for the hand 60. After the substitution, the sheet is moved while being gripped by the thin hand 61, and thus the sheets are stacked by a predetermined number of sheets, and thereafter, the thin hand is removed. The sheets stacked in this way are discharged by a belt conveyor 63 or the like. The stacked sheets can be fixed by hot-melt resin or the like.

Due to such an automated process, it is possible (to attain labor-saving).

A flat hollow fiber membrane module which is used as, for example, a filtering material of a solid-liquid separation system can be produced by using the hollow fiber membrane sheet-like object S obtained by the above production method. The flat hollow fiber membrane module can be produced by stacking a plurality of hollow fiber membrane sheet-like objects S, fixing an end portion on at least one side of the hollow fiber membrane H by potting resin, disposing the end portion so as to be accommodated inside a housing, and opening the potted end of the hollow fiber membrane.

INDUSTRIAL APPLICABILITY

According to the invention, a traversing mechanism is unnecessary and the production device can be constructed with fewer components.

Further, due to the device using this method, as means for fixing the hollow fiber membranes into the form of a sheet, it becomes possible to adopt fixing means for fixing the hollow fiber membranes arranged in a row, from both sides with the hollow fiber membranes interposed therebetween.

REFERENCE SIGNS LIST

B: fixed section
C: connection section
H: hollow fiber membrane
L: hollow fiber membrane loop (ring-shaped section)
1: first roll (roll)
2: second roll (roll)
3: frame
4: first ultrasonic welding machine (connecting means)
5: bobbin
6: guide roll
7: horn
8: anvil
9: second ultrasonic welding machine (fixing means)
10: base
11: ultrasonic cutter (cutting means)
12: motor (driving means)

The invention claimed is:
1. A method for producing a hollow fiber membrane sheet object, the method comprising:

(I) forming a ring-shaped section by winding a hollow fiber membrane capable of being continuously supplied, around two or more rolls so as to surround the two or more rolls, to obtain a wound hollow fiber membrane, and connecting a leading end portion of the wound hollow fiber membrane and an adjacent hollow fiber membrane, or putting a ring-shaped section created in advance, on two or more rolls, and connecting a leading end portion of a hollow fiber membrane capable of being continuously supplied, to the ring-shaped section;

(II) winding the hollow fiber membrane around the rolls by moving the leading end portion of the hollow fiber membrane by rotating at least one roll of the two or more rolls;

(III) forming a fixed section by fixing the hollow fiber membrane wound around the two or more rolls, into the form of a sheet in a width direction; and (IV) performing cutting-out along the fixed section, thereby obtaining a sheet object in which end portions of the hollow fiber membranes are connected in the width direction.

2. The method of claim 1, wherein in the winding (II), the leading end portion is wound around outer peripheries of the rolls while changing a relative position of the leading end portion on the rolls in a roll width direction for each round.

3. The method of claim 2, wherein in the winding (II), the leading end portion is moved without changing a relative position of the leading end portion with respect to the rolls while the leading end portion is in contact with the rolls.

4. The method of claim 1, wherein axes of the two or more rolls surrounded by the hollow fiber membrane are disposed so as to be parallel to each other.

5. The method of claim 1, wherein at least one roll of the two or more rolls comprises circumferential grooves over approximately an entire area in the width direction.

6. The method of claim 5, wherein pitches of the grooves are the same pitch.

7. The method of claim 1, wherein the two or more rolls are disposed in a vertical direction.

8. The method of claim 1, further comprising after (III) and before (IV):

adjusting a winding peripheral length.

9. A method for producing a hollow fiber membrane module, the method comprising:

fixing an end portion on at least one side of the hollow fiber membrane sheet object obtained by the method according to claim 1 to a housing with a potting resin.

10. A device, comprising:

two or more rolls;

a supplier, which continuously supplies a hollow fiber membrane to the two or more rolls;

a connector, which forms a ring-shaped section by winding the hollow fiber membrane capable of being continuously supplied, around the two or more rolls so as to surround the two or more rolls and connects a leading end portion of the wound hollow fiber membrane and an adjacent hollow fiber membrane, or puts a ring-shaped section created in advance, on the two or more rolls, and connects a leading end portion of the hollow fiber membrane capable of being continuously supplied, to the ring-shaped section;

a driver, which rotates at least one roll of the two or more rolls, thereby winding the hollow fiber membrane around the two or more rolls; and a fixer, which fixes the hollow fiber membranes into the form of a sheet in a width direction of each of the two or more rolls.

11. The device of claim 10, further comprising:

a cutter, which cuts a fixed section formed by the fixer to cut out the plurality of hollow fiber membranes at the fixed section.

12. The device of claim 10, wherein axes of the two or more rolls surrounded by the hollow fiber membrane are disposed so as to be parallel to each other.

13. The device of claim 10, wherein at least one roll of the two or more rolls comprises circumferential grooves over approximately an entire area in the width direction.

14. The device of claim 13, wherein pitches of the grooves are the same pitch.

15. The device of claim 13, wherein grooves comprised in one of the two or more rolls and grooves comprised in the other rolls are parallel.

16. The device of claim 10, wherein the two or more rolls are disposed in a vertical direction.

17. The device of claim 10, wherein the supplier is a bobbin unwinding device.

18. The device of claim 10, further comprising:

an adjuster, which adjusts a winding peripheral length.

* * * * *